(12) United States Patent
Sandholm et al.

(10) Patent No.: US 8,165,921 B1
(45) Date of Patent: *Apr. 24, 2012

(54) DYNAMIC EXCHANGE METHOD AND APPARATUS

(75) Inventors: Tuomas Sandholm, Pittsburgh, PA (US); David L. Levine, Chesterfield, MO (US); Subhash Suri, Santa Barbara, CA (US); Robert L. Shields, Pittsburgh, PA (US); Christopher Cole, Pittsburgh, PA (US); Richard James McKenzie, Jr., Butler, PA (US); David C. Parkes, Cambridge, MA (US); Vincent Conitzer, Pittsburgh, PA (US); Benjamin Schmaus, Pittsburgh, PA (US)

(73) Assignee: CombineNet, Inc., Pittsburgh, PA (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/368,354

(22) Filed: Feb. 10, 2009

Related U.S. Application Data

(63) Continuation of application No. 10/803,549, filed on Mar. 18, 2004, now Pat. No. 7,499,880, which is a continuation-in-part of application No. 10/254,241, filed on Sep. 25, 2002, now Pat. No. 7,610,236.

(51) Int. Cl.
  *G06Q 30/00* (2012.01)
(52) U.S. Cl. ............... 705/26.3; 705/35; 705/37; 705/39
(58) Field of Classification Search .................. 705/26.3, 705/35, 37, 39
  See application file for complete search history.

(56) References Cited

U.S. PATENT DOCUMENTS

| | | | |
|---|---|---|---|
| 5,905,975 | A | 5/1999 | Ausubel |
| 6,021,398 | A | 2/2000 | Ausubel |
| 6,026,383 | A | 2/2000 | Ausubel |
| 6,035,287 | A | 3/2000 | Stallaert et al. |
| 6,272,473 | B1 | 8/2001 | Sandholm |
| 6,415,270 | B1 | 7/2002 | Rackson et al. |

(Continued)

FOREIGN PATENT DOCUMENTS

JP  2001290968 A  10/2001

(Continued)

OTHER PUBLICATIONS

Katia Sycara, "Utility Theory in Conflict Resolution", Annals of Operations Research 12(1988) 65-84.

(Continued)

*Primary Examiner* — Yogesh C Garg
(74) *Attorney, Agent, or Firm* — The Webb Law Firm

(57) ABSTRACT

In a live, expressive combinatorial exchange, each of plural bidders can submit a bid. Based on the submitted bids, an allocation of the bids is determined that is optimal for the type of exchange being conducted. At least a portion of each bid of the allocation is displayed to each bidder of a first subset of the bidders that has at least one bid that is not included in the allocation. Each bidder of a subset of the first subset of bidders can then amend one or more of their existing bids or submit a new bid that is considered the next time the allocation is determined. The process of feeding back at least a portion of each bid of the allocation, submitting new bids or amendments to existing bids, and determining a new allocation based on all of the submitted bids continues until a predetermined condition is satisfied.

50 Claims, 18 Drawing Sheets

U.S. PATENT DOCUMENTS

| | | |
|---|---|---|
| 6,704,716 B1 | 3/2004 | Force |
| 6,718,312 B1 | 4/2004 | McAfee et al. |
| 7,043,446 B1 | 5/2006 | Dietrich et al. |
| 7,058,602 B1 | 6/2006 | La Mura et al. |
| 7,133,841 B1 * | 11/2006 | Wurman et al. ............. 705/37 |
| 7,337,139 B1 | 2/2008 | Ausubel |
| 7,467,111 B2 * | 12/2008 | Ausubel ...................... 705/37 |
| 2001/0042041 A1 | 11/2001 | Moshal et al. |
| 2002/0046037 A1 | 4/2002 | Ausubel et al. |
| 2002/0052828 A1 | 5/2002 | Ausubel |
| 2003/0004850 A1 | 1/2003 | Li et al. |
| 2005/0102215 A1 | 5/2005 | Ausubel et al. |
| 2007/0055606 A1 | 3/2007 | Ausubel et al. |

FOREIGN PATENT DOCUMENTS

| | | |
|---|---|---|
| JP | 2001344457 A | 12/2001 |
| JP | 200299777 A | 4/2002 |
| WO | 0131537 A2 | 5/2001 |
| WO | 0133400 A2 | 5/2001 |
| WO | 0133401 A2 | 5/2001 |

OTHER PUBLICATIONS

Michael Rothkopf, Alexander Pekeč and Ronald Harstad, "Computationally Manageable Combinatorial Auctions", Rutcor Research Report, pp. 21, Apr. 1995.

Yuzo Fujishima, Kevin Leyton-Brown and Yoav Shoham, "Taming the Computational Complexity of Combinatorial Auctions: Optimal and Approximate Approaches", Proceedings of the Sixteenth International Joint Conference on Artificial Intelligence (IJCAI), pp. 6, (1999).

Tuomas Sandholm, "An Algorithm for Optimal Winner Determination in Combinatorial Auctions", Proceedings of the Sixteenth International Joint Conference on Artificial Intelligence (IJCAI), pp. 6, (1999).

Holger Hoos and Craig Boutilier, "Solving Combinatorial Auctions Using Stochastic Local Search", Proceedings of the National Conference on Artificial Intelligence (AAAI), pp. 8, Aug. 2000.

Noam Nissan, "Bidding and Allocation in Combinatorial Auctions", Proceedings of the ACM Conference on Electronic Commerce (ACM-EC), pp. 25, (2000).

Tuomas W. Sandholm, "eMediator: A Next Generation Electronic Commerce Server", Washington University, St. Louis, Department of Computer Science Technical Report, WU-CS-99-02, pp. 341-348, Jan. 1999.

Moshe Tennenholtz, "Some Tractable Combinatorial Auctions", Proceedings of the National Conference on Artificial Intelligence (AAAI), pp. 6, Aug. 2000.

Tuomas W. Sandholm and Subhash Suri, "Improved Algorithms for Optimal Winner Determination in Combinatorial Auctions and Generalizations", Proceedings of the National Conference on Artificial Intelligence (AAAI), pp. 8, (2000).

David C. Parkes; "iBundle: An Efficient Ascending Price Bundle Auction"; In Proc. ACM Conference on Electronic Commerce (EC-99), Denver, Nov. 1999; 10 pages.

David C. Parkes and Lyle H. Ungar; "An Ascending-Price Generalized Vickrey Auction"; Stanford Institute for Theoretical Economics (SITE) 2002 Summer Workshop: The Economics of The Internet, Jun. 25-Jun. 29, 2002; pp. 1-56.

David C. Parkes and Lyle H. Ungar; "Iterative Combinatorial Auctions: Theory and Practice"; In Proc. 7th National Conference on Artificial Intelligence (AAAI-00), 8 pages.

David C. Parkes and Lyle H. Ungar; "Preventing Strategic Manipulation in Iterative Auctions: Proxy Agents and Price-Adjustment"; In Proc. 17th National Conference on Artificial Intelligence (AAAI-0); 2000; 8 pages.

Charles R. Plott; "Laboratory Experimental Testbeds: Application to the PCS Auction"; Massachusetts Institute of Technology; Journal of Economics & Management Strategy, vol. 6, No. 3, Fall 1997, pp. 605-638.

Lawrence M. Ausubel and Paul R. Milgrom; "Ascending Auctions With Package Bidding"; Frontiers of Theoretical Economics'; vol. 1; Issue 1; Article 1; 2002; 44 pages.

Andrew J. Davenport and Jayant R. Kalagnanam; "Price Negotiations for Procurement of Direct Inputs"; IBM Technical Report RC 22078; May 31, 2001; 21 pages.

Christine Demartini, Anthony M. Kwasnica, John O. Ledyard and David Porter; "A New and Improved Design for Multi-Object Iterative Auctions"; Mar. 15, 1999; 45 pages.

Marta Eso, Soumyadip Ghosh, Jayant R. Kalagnanam and Laszlo Ladanyi; "Bid Evaluation in Procurement Auctions With Piece-Wise Linear Supply Curves"; IBM Research Report RC22219 (WO110-087); Oct. 31, 2001; 36 pages.

Frank Kelly and Richard Steinberg; "A Combinatorial Auction With Multiple Winners for Universal Service"; Management Science; vol. 46, No. 4; Apr. 2000, pp. 586-596.

John O. Ledyard, David Porter and Antonio Rangel; Experiments Testing MutliObject Allocation Mechanisms; Massachusetts Institute of Technology; Journal of Economics & Management Strategy; vol. 6, No. 3; Fall 1997; pp. 639-675.

Tuomas Sandholm, Subhash Suri, Andrew Gilpin and David Levine; "Winner Determination in Combinatorial Auction Generalizations"; AAMAS'02, Jul. 15-19, 2002; 8 pages.

Lawrence M. Ausubel; "An Efficient Ascending-Bid Auction for Multiple Objects"; University of Maryland, Department of Economics; Aug. 7, 2002; 26 pages.

Sushil Bikhchandani and Joseph M. Ostroy; "Ascending Price Vickrey Auctions"; University of California, Los Angeles; Anderson School of Management and Dept. of Economics; Aug. 29, 2002; 34 pages.

Frank Gul and Ennio Stacchetti; "The English Auction With Differentiated Commodities"; Jul. 22, 1999; 25 pages.

Gabrielle Demange, David Gale and Marilda Sotomayor; "Multi-Item Auctions"; Journal of Political Economy; vol. 94, No. 4; 1986; pp. 863-872.

Peter R. Wurman and Michael P. Wellman; "AkBA: A Progressive, Anonymous-Price Combinatorial Auction"; EC' 00, Oct. 17-20, 2000, 9 pages.

Jayant R. Kalagnanam et al.: "Computational aspects of clearing continuous call double auctions with assignment constraints and indivisible demand", IBM Research Report RC21660 (97613), Feb. 2, 2000, pp. 1-15.

Andrew J. Davenport et al.: "Price negotiations for procurement of direct inputs", IBM Technical Report RC22078, May 31, 2001, pp. 1-21.

Jayant Kalagnanam et al.: "Minimizing Procurement Costs for Strategic Sourcing", IBM White Paper, 2001, IBM T.J. Watson Research Center.

Joni Lynne Jones: "Incompletely Specified Combinatorial Auction: An Alternative Allocation Mechanism for Business-To-Business Negotiations", Doctoral Thesis Presented to the Graduate School of the University of Florida, 2000, UMI No. 9984436, Bell & Howell Information and Learning Company, Ann Arbor, Michigan.

Joni L. Jones et al.: "Incompletely Specified Combinatorial Auctions", Oct. 25, 2000, pp. 1-32.

Christopher George Caplice: "An Optimization Based Bidding Process: A New Framework for Shipper-Carrier Relationships", Doctoral Thesis, MIT Jun. 1996.

Tuomas Sandholm, "An Algorithm for Optimal Winner Determination in Combinatorial Auctions", Washington University, WU-CS-99-01, Jan. 28, 1999.

* cited by examiner

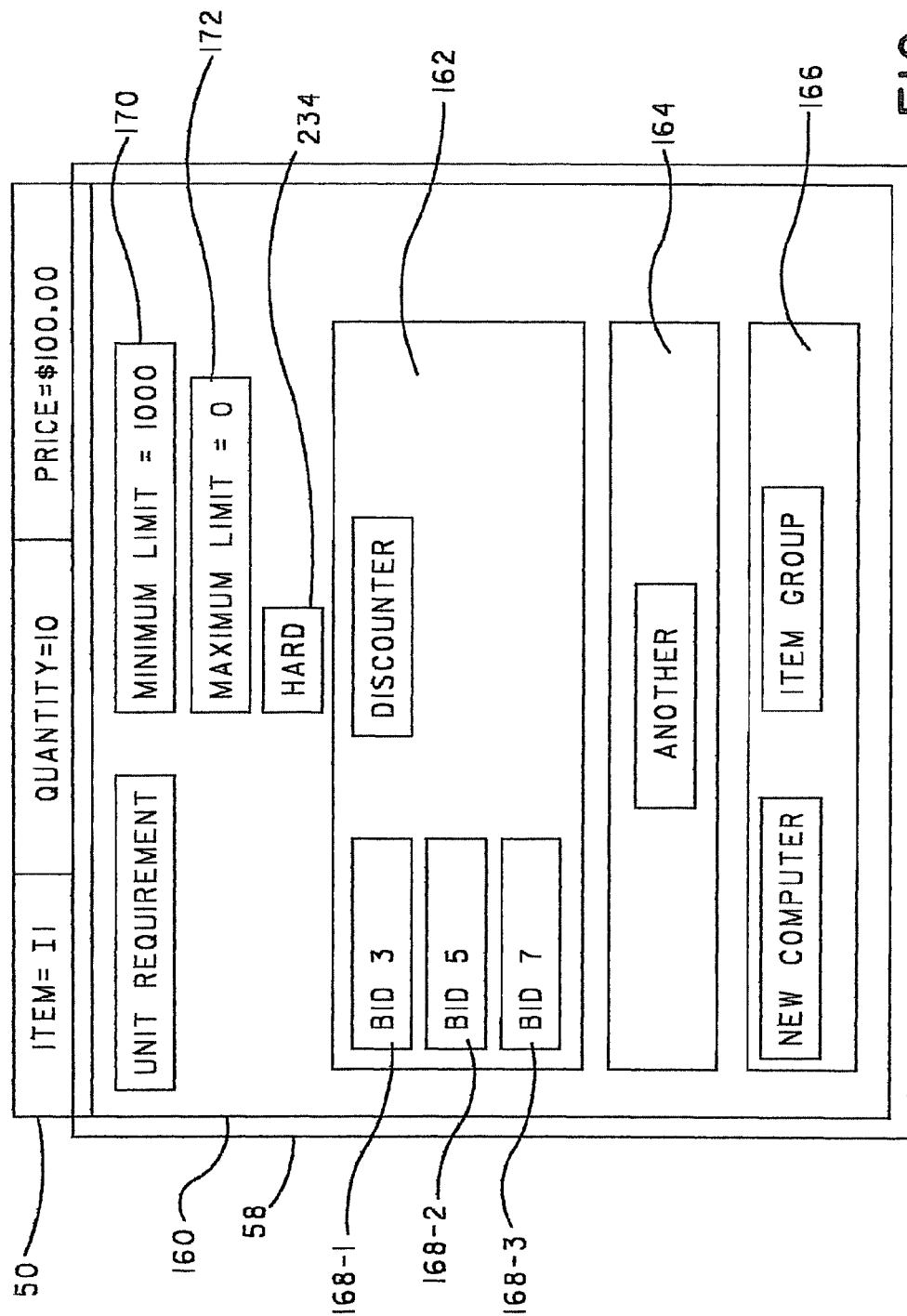

| ALLOCATION CONSTRAINED | |
|---|---|
| BID 5 | |
| BID 10 | VALUE = $1000.00 |
| BID 15 | |

| ALLOCATION RELAXATION: COST = 1000 | |
|---|---|
| BID 5 | |
| BID 10 | |
| BID 15 | VALUE = $4000.00 |
| BID 20 | |
| BID 25 | |

| ALLOCATION UNCONSTRAINED | |
|---|---|
| BID 5 | |
| BID 15 | |
| BID 30 | VALUE = $5000.00 |
| BID 35 | |
| BID 45 | |
| BID 55 | |

240 — (first group)
242 — (second group)
244 — (third group)

FIG. 16

DYNAMIC EXCHANGE METHOD AND APPARATUS

CROSS REFERENCE TO RELATED APPLICATIONS

This application is a continuation of U.S. patent application Ser. No. 10/803,549, filed Mar. 18, 2004, which is a continuation-in-part of U.S. patent application Ser. No. 10/254,241, filed Sep. 25, 2002, both of which are incorporated herein by reference.

BACKGROUND OF THE INVENTION

1. Field of the Invention

The present invention relates to combinatorial exchanges and, more particularly, to a method of conducting a live, expressive combinatorial exchange, and computer instructions which, when executed by a processor, cause the processor to perform one or more steps of the method.

2. Description of Related Art

Various systems have been proposed and constructed to support online exchanges. The most general type of exchange is a pure exchange which permits one or more bidders to offer to sell and/or purchase one or more items to/from one or more bid takers. An item may be any entity of value, such as a good, service or money. A forward auction is a special case of an exchange with a single seller. A reverse auction is a special case of an exchange with a single buyer.

Combinatorial exchanges support advanced exchange designs and expressive bidding. These features permit the exchange to be designed to achieve best economic efficiency.

One example of expressive bidding is combinatorial bids. Combinatorial bids allow bidders to bid on multiple items with a single bid. The combination, or bundle of items, is determined by the bidder. This is advantageous, when the items exhibit complementarity, i.e., when the value of the bundle of items is worth more to the bidder than the sum of the separate item values, or substitutability, i.e., where different items are interchangeable to the bidder. Combinatorial bids allow bidders to express their true preference, resulting in the best economic allocation.

Heretofore, participants in a combinatorial exchange, especially bidders and bid takers, received little or no meaningful feedback regarding submitted bids and/or rules that determine how the exchange allocation is determined. This lack of meaningful feedback often resulted in bidders placing bid's without any assurance that such bid(s) would be competitive. While simple forward or reverse auctions often provide feedback regarding the current winning price, in a combinatorial exchange, especially a live exchange, providing the current winning price may be, and often is, insufficient to enable exchange participants to submit competitive bids and/or rules that modify the exchange objective. This is because the current winning price is often not the only criteria by which an allocation is determined in a combinatorial exchange.

What is, therefore, needed and not disclosed in the prior art is a method and apparatus for conducting a live combinatorial exchange that overcomes the above problem and others.

SUMMARY OF THE INVENTION

The invention is a method of conducting a live combinatorial exchange. The method can include (a) receiving from each of a plurality of bidders at least one bid comprised of at least one item, an initial quantity of each item, and a price for all of the item(s) and their quantities; (b) determining an allocation that is optimal for the type of exchange being conducted, wherein said allocation includes a plurality of bids with each bid of said allocation including all of the items of the bid and at least part of the initial quantity of each item; (c) causing at least a portion of each bid of said allocation to be displayed to each bidder a first subset of the bidders that has at least one bid that is not included in said allocation; (d) receiving from each bidder of a subset of the first subset of bidders at least one of a new bid and an amendment to an existing bid of the bidder; and (e) repeating steps (b)-(d) until a predetermined condition is fulfilled.

Each item can include one of a tangible good, a service and money.

The predetermined condition can include (i) a lapse of a predetermined time interval from commencement of the exchange, (ii) a manual abort, or (iii) a sum of the prices of the bids of the allocation reaching a predetermined value.

Each bid of a subset of the bids can have associated therewith exchange description data (EDD) established by the bidder of said bid (bidder EDD). Bidder EDD can include at least one rule (or constraint) for processing (i) a bid, (ii) at least one item of a bid, and/or (iii) a subset of bids that includes all or less than all of the bids when determining the allocation. Step (b) can further include determining the allocation as a function of bidder EDD.

Bidder EDD can include at least one rule related to: bid attribute(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s).

The portion of the at least one bid in step (c) can include (i) the at least one item of the bid, (ii) the quantity of the at least one item of the bid, (iii) the price for all of item(s) and their quantities, and/or (iv) at least a portion of the bidder EDD.

The method can further include displaying a portion of at least one bid that was determined to be part of the allocation to each bidder of a second subset of bidders that has at least one bid that is part of the allocation.

Each subset of bidders can include all or less than all of the bidders, and each subset of bids can include all or less than all of the bids.

The exchange can be a pure exchange, a forward auction or a reverse auction.

The amendment to the existing bid in step (d) can include the addition of at least one new rule to bidder EDD associated with the existing bid; the deletion of at least one rule from bidder EDD associated with the existing bid; the amendment of a value associated with at least one rule of bidder EDD associated with the existing bid; the amendment of a value of the quantity of at least one item of the existing bid; and/or the amendment of the price for all of the item(s) and their quantities.

The method can further include imposing at least one supervisory constraint that limits at least one of (i) adding at least one rule to a bidder EDD, (ii) deleting at least one rule from a bidder EDD, (iii) relaxing at least one rule of a bidder EDD and (iv) tightening at least one rule of a bidder EDD.

Step (b) can further include determining the allocation based on EDD established by a bid taker (bid taker EDD). Step (d) can further include receiving from the bid taker a new bid taker EDD and/or an amendment to an existing bid taker EDD of the bid taker. The amendment to the existing bid taker EDD of the bid taker can include adding at least one new rule to the existing bid taker EDD; deleting at least one rule from the existing bid taker EDD; and/or amending a value associated with at least one rule of the existing bid taker EDD.

The method can further include extending the predetermined time interval in response to receiving a bid that improves the allocation within a predetermined duration of the end of the predetermined time interval. In an exchange that includes plural bidders and plural bid takers, the allocation improves if (i) the number of items exchanged increases or (ii) if a difference between a sum of the prices of the buy bids and a sum of the prices of the sell bids of the allocation increases. In an exchange that includes plural buyers and a single seller, i.e., a forward auction, the allocation improves if a sum of the prices of the bids of the allocation increases. In an exchange that includes a single buyer and plural sellers, i.e., a reverse auction, the allocation improves if a sum of the prices of the bids of the allocation decreases.

The method can further include OR'ing all the received bids and XOR'ing bids received from one bidder that include at least one item in common.

Step (b) can further include determining the allocation as a function of exchange description data (EDD) established by a bid taker (bid taker EDD). Bid taker EDD can include at least one rule (or constraint) for processing a bid, at least one item of a bid, and/or a subset of the plurality of the bids when determining the allocation.

Step (d) can further include receiving from the bid taker at least one of new bid taker EDD and an amendment to an existing bid taker EDD of the bid taker. The amendment to the existing bid taker EDD of the bid taker can include adding at least one new rule to the existing bid taker EDD, deleting at least one rule from the existing bid taker EDD, and/or amending a value associated with at least one rule of the existing bid taker EDD.

The method can further include imposing at least one supervisory constraint that limits at least one of (i) adding at least one rule to a bid taker EDD, (ii) deleting at least one rule from a bid taker EDD, (iii) relaxing at least one rule of a bid taker EDD and (iv) tightening at least one rule of a bid taker EDD.

The bid taker EDD can include at least one rule related to: objective(s), constraint relaxer(s), feasibility obtainer(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s).

The method can further include causing an identification of the bidder of the bid to be displayed in step (c). The displayed bidder identification can be obscured.

At least one rule can be introduced into at least one bidder EDD in response to a bidder specifying (i) a precondition of said rule and (ii) an effect to be applied if said precondition is satisfied. At least one rule can be introduced into at least one bid taker EDD in response to a bid taker specifying (i) a precondition of said rule and (ii) an effect to be applied if said precondition is satisfied. The bidder and/or the bid taker can utilize a graphical user interface on a display 18 of a computer 2 to specify the precondition and the effect.

Any one or combination of the foregoing steps can be embodied on computer readable medium as instructions which, when executed by a processor, cause the processor to perform one or more of said steps.

BRIEF DESCRIPTION OF THE DRAWINGS

FIG. 8b is a block diagram of a bid and an associated bidder EDD that has a unit requirement rule associated therewith;

FIG. 16 illustrates the various allocations resulting from the selection of corresponding desired solutions of the constraint relaxer rule of FIG. 15.

DETAILED DESCRIPTION OF THE INVENTION

The present invention is directed to a method for solving a live, expressive combinatorial exchange.

Figure 1:
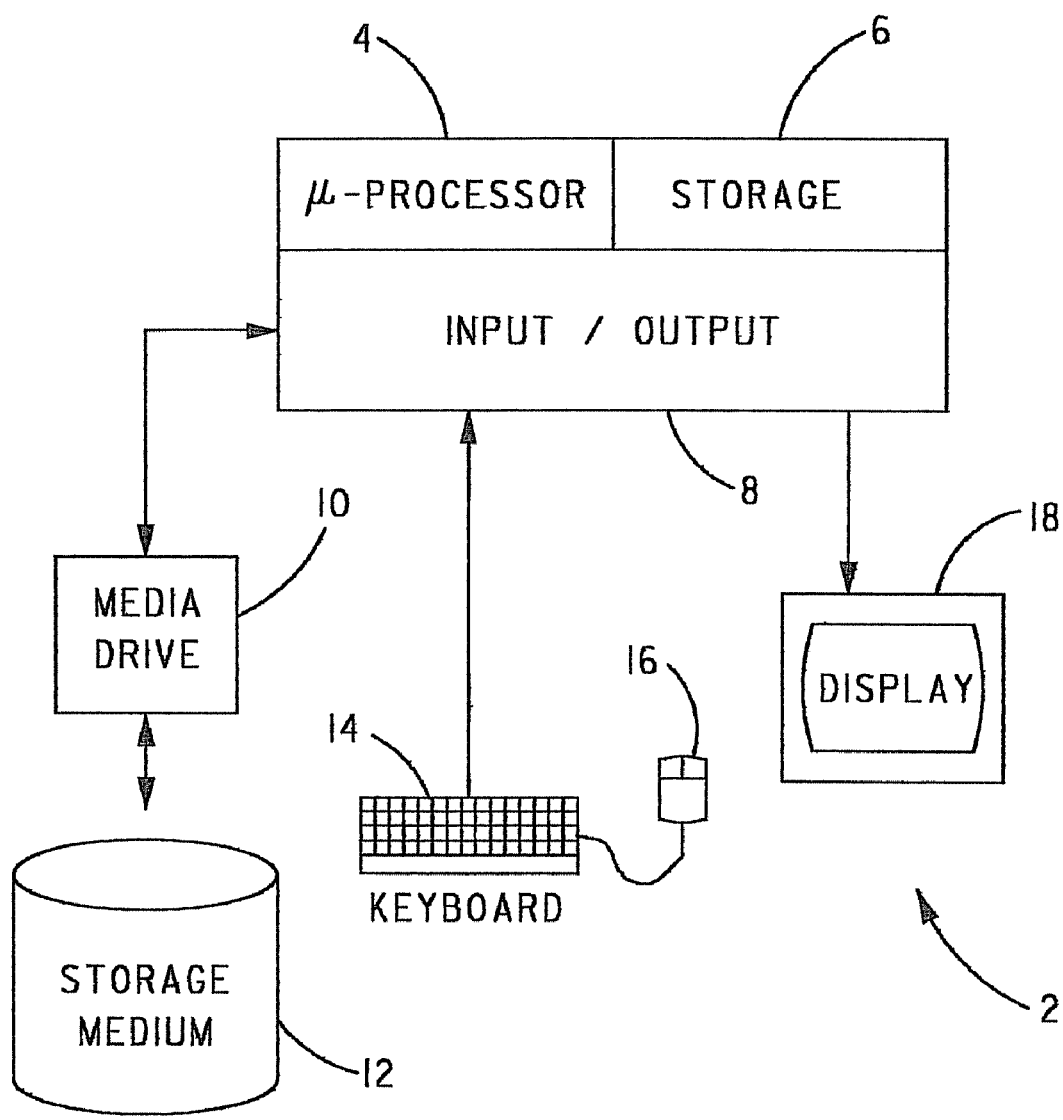
FIG. 1 is a block diagram of an exemplary computer that can be utilized by each participant in a live, expressive combinatorial exchange.

With reference to FIG. 1, the present invention is embodied in computer software which executes on one or more networked computers 2. Each computer 2 includes a microprocessor 4, a computer storage 6 and an input/output system 8. Each computer 2 can also include a media drive 10, such as a disk drive, CD-ROM drive, and the like. Media drive 10 can operate with a computer storage medium 12 capable of storing the computer software that embodies the present invention, which computer software is able to configure and operate computer 2 in a manner to implement the present invention. Input/output system 8 can include a keyboard 14, a mouse 16 and/or a display 18. Computer 2 is exemplary of a computer capable of executing the computer software of the present invention and is not to be construed as limiting the invention.

Figure 2:
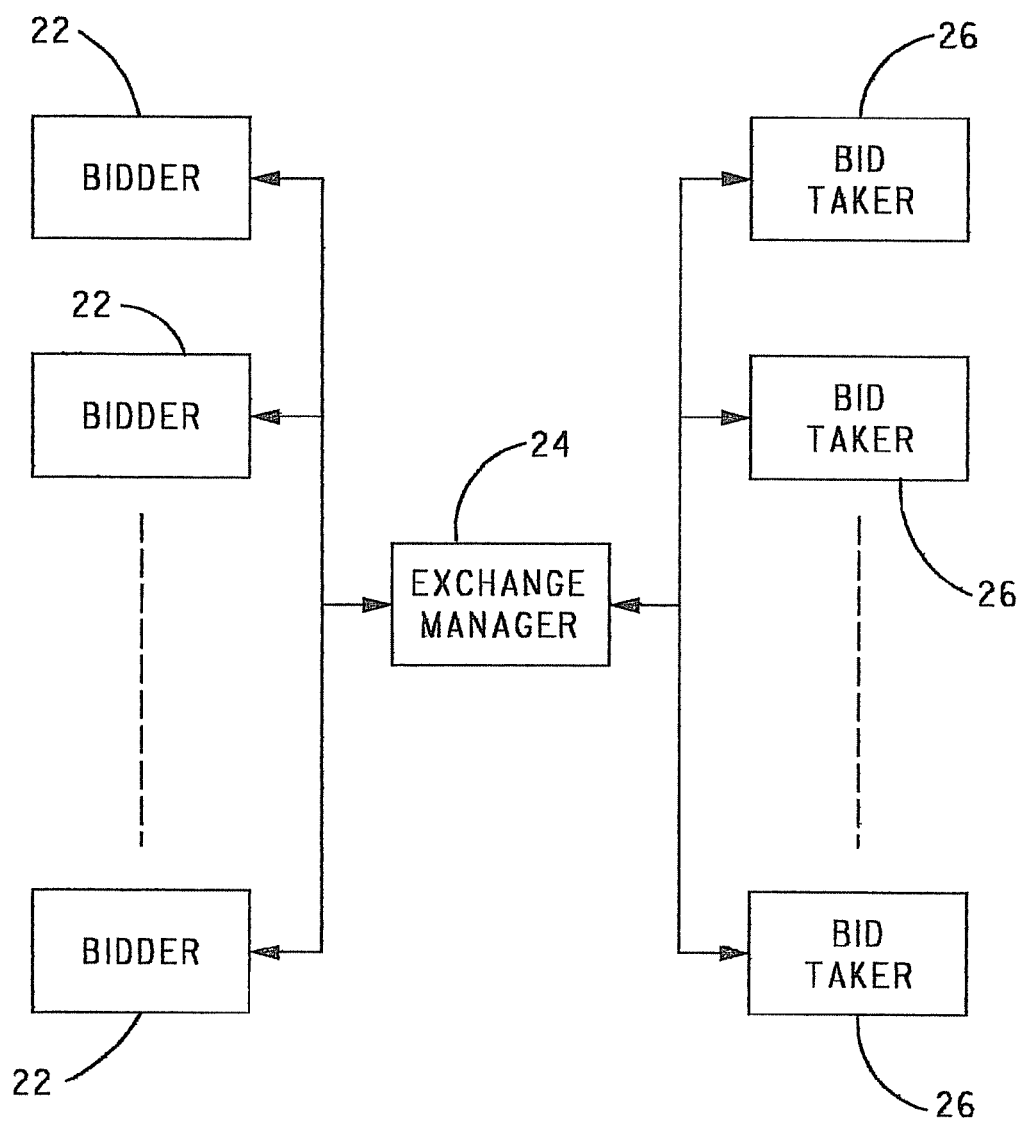
FIG. 2 is a generalized block diagram of networked participants in the live, expressive combinatorial exchange, wherein each participant utilizes a computer of the type shown in FIG. 1 to participate in the exchange.

With reference to FIG. 2, and with continuing reference to FIG. 1, a typical exchange includes a plurality of bidders 22, an exchange manager 24 and a plurality of bid takers 26. Each bidder 22, the exchange manager 24 and each bid taker 26 utilizes a computer 2 of the type described above to conduct the auction. The computer 2 of exchange manager 24 is networked to the computers 2 of bidders 22 and the computers 2 of bid takers 26. The computer 2 of exchange manager 24 includes optimizing software that is utilized to process bids received from bidders 22, and/or rules associated with "exchange description data" (EDD) accompanying one or more bids received from bidders 22 and/or received from one or more bid takers 26. The EDD received from bidders 22 and/or bid takers 26 modifies the manner in which the optimizing software determines a feasible solution or allocation that is optimal for the type of exchange being conducted. Examples of the types of exchanges that can be conducted include a pure exchange having plural bidders and plural bid takers that exchange items such as tangible goods, services and/or money; an exchange having plural buyers and a single seller (forward auction); and an exchange that includes a single buyer and plural sellers (reverse auction). However, this is not to be construed as limiting the invention.

One example of optimizing software includes a linear or mixed integer program solver that includes one or more decision variables each having one or more associated bounds or constraints. Another example of optimizing software suitable for use with the present invention is described in U.S. Pat. No. 6,272,473 which is incorporated herein by reference. In operation, the optimizing software determines an optimal solution or allocation for the type of exchange being conducted subject to bids received from bidders 22, EDD associated with the one or more bids received from bidders 22, and/or EDD received from one or more bid takers 26.

Figure 3:
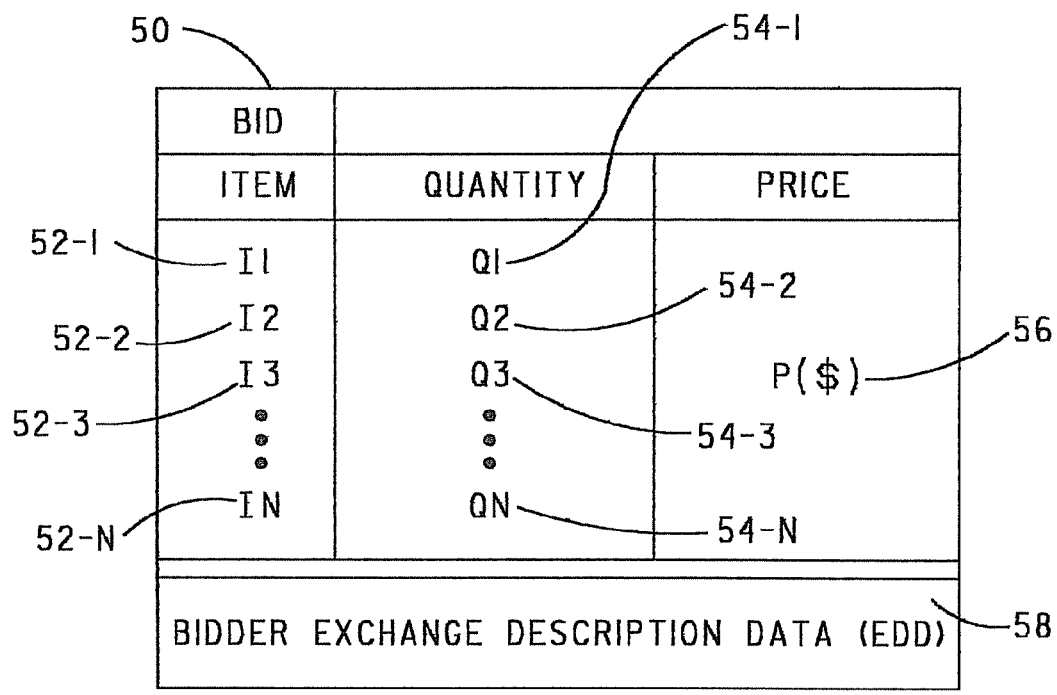
FIG. 3 is block diagram of exemplary bid having bidder exchange description data (EDD) associated therewith.

With reference to FIG. 3, and with continuing reference to FIGS. 1 and 2, during an exchange event, each bidder 22 can provide to exchange manager 24 one or more bids 50 that can include one or more items I1 52-1, I2 52-2, I3 52-3, . . . , IN 52-N having associated quantities 54-1, 54-2, 54-3, . . . , 54-N, respectively, and an associated bid price 56. Each bid 50 can also have associated therewith bidder EDD 58.

Figure 4:
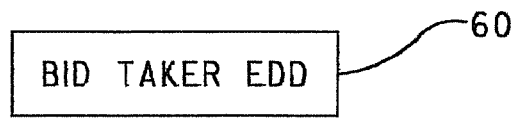
FIG. 4 is a block diagram of bid taker EDD.

Each bidder EDD 58 can include data that a preprocessor of computer 2 of exchange manager 24 converts into one or more rules for processing by the optimization software to determine the optimal allocation of bids. Also or alternatively, each bidder EDD 58 can have associated therewith one or more rules for processing by the optimization software to determine the optimal allocation of bids. Each rule associated with a bidder EDD 58 is typically derived from data entered into fields displayed on a display of the computer 2 of the bidder 22 submitting the bid. However, this is not to be construed as limiting the invention since the rules associated with a bidder EDD 58 may also be derived from data entered into the computer 2 of exchange manager 24 and/or data entered into the computer 2 of one or more bid takers 26:

With reference to FIG. 4, and with continuing reference to FIGS. 1-3, each bid taker 26 can provide to computer 2 of exchange manager 24 one or more bid taker EDD 60, each of which has one or more rules associated therewith, that the optimizing software utilizes to determine the optimal allocation of bids received from bidders 22. Like the rules associated with each bidder EDD 58, the rules associated with each bid taker EDD 60 can be instantiated at the computer 2 of the corresponding bid taker 26 in response to the entry of corresponding data by bid taker 26, or by the preprocessor of the computer 2 of exchange manager 24 from data extracted from the bid taker EDD 60 received from the corresponding bid taker 26. Each rule associated with a bid taker EDD 60 is typically derived from data entered into fields displayed on a display of the computer 2 of the bid taker 26 submitting the bid taker EDD 60. However, this is not to be construed as limiting the invention since the rules associated with a bid taker EDD 60 may also be derived from data entered into the computer 2 of exchange manager 24 and/or data entered into the computer 2 of one or more bidders 22.

As can be seen, each bidder EDD 58 and/or each bid taker EDD 60 includes one or more rules that the optimizing software utilizes to determine the optimal allocation, and/or includes data that a preprocessor of the computer 2 of the exchange manager converts into one or more rules that the optimizing software utilizes to determine the optimal allocation. For the purpose of simplifying the description of the invention, hereinafter, each bidder EDD 58 and each bid taker EDD 60 will be described as having one or more rules associated therewith out regard to where said one or more rules were instantiated.

Each bidder EDD 58 has associated therewith at least one rule related to bid attribute(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s). Each bid taker EDD 60 has associated therewith at least one rule related to objective(s), constraint relaxer(s), feasibility obtainer(s) bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s). These rules will now be described in greater detail.

Figure 5:
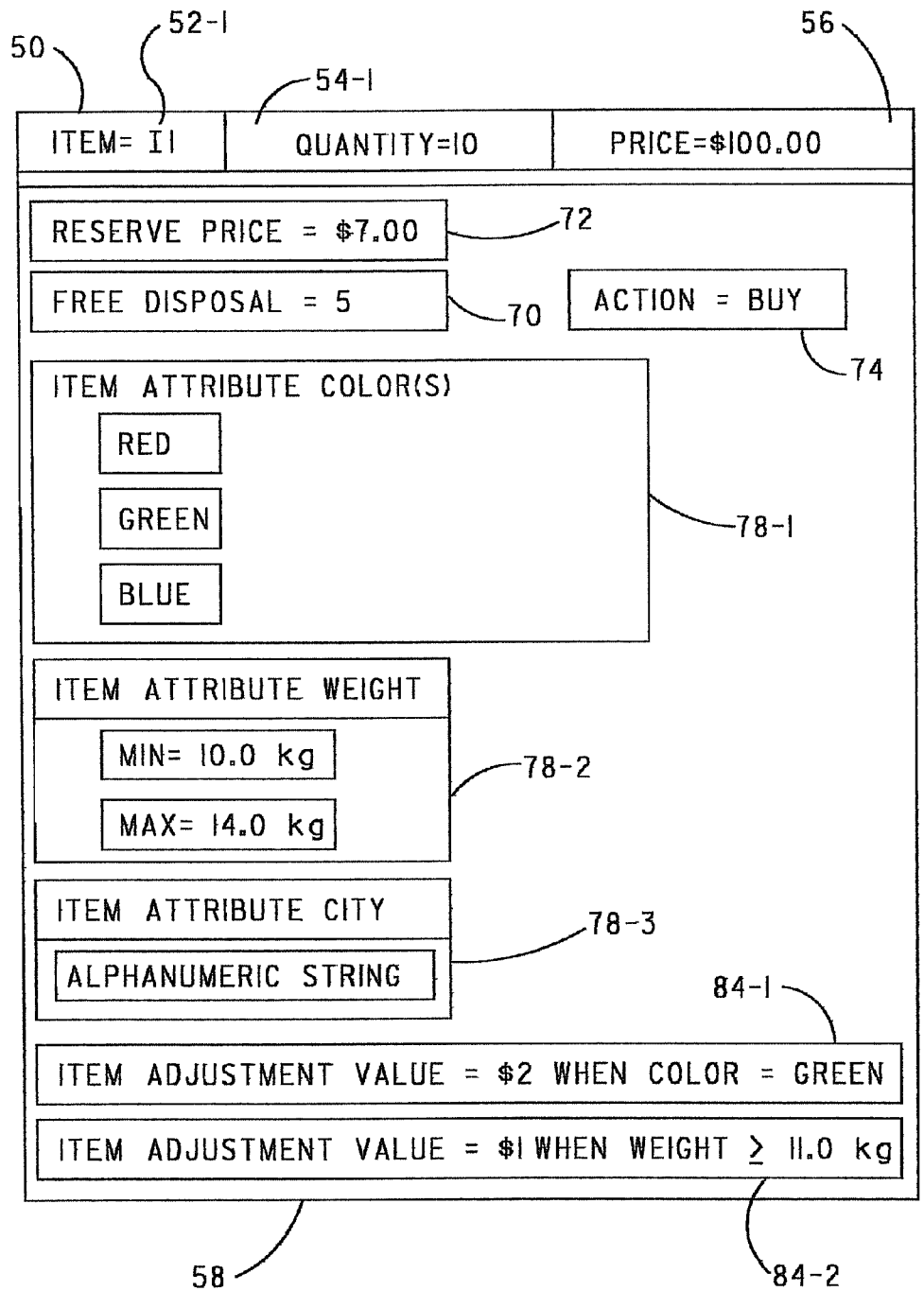
FIG. 5 is a block diagram of a bid having associated therewith bidder EDD that has rules associated therewith related to free disposal, reserve price, action, item attribute and item adjustment.

With reference to FIG. 5, and with continuing reference to FIGS. 1-4, suppose that bid 50 only includes item I1 52-1 for a quantity 54-1 of 10 at a price 56 of $10.00. If bid 50 is created by a bidder 22 acting as a buyer, price 56 indicates the amount bidder 22 is willing to pay (or "bid") for the quantity 54-1 of item 52-1. In contrast, if bid 50 is created by a bidder 22 acting as a seller, price 56 is an amount bidder 22 would like to receive (or "ask") for the quantity 54-1 of the item 52-1. If desired, bid 50 can be for a plurality of items 52, each of which has its own associated quantity, and price 56 can be for all of the quantities of all of the items. In FIG. 5, bid 50 has associated therewith a bidder EDD 58 that has associated therewith one or more rules related to free disposal 70, reserve price 72 and/or action 74.

Free Disposal Rule:

When a bidder 22 acts as a seller, a bidder EDD 58 associated with a bid 50 of bidder 22 can have associated therewith a free disposal rule 70 that enables the optimizing software to sell less than the specified quantity 54-1 of item 52-1 without affecting bid price 56. When bidder 22 is acting as a buyer, the free disposal rule 70 enables the optimizing software to accept more than the specified quantity 54-1 of item 52-1 without affecting the bid price 56. The free disposal rule 70 may be used on both the supply side and demand side of all exchange formats, including forward auctions and reverse auctions. In the example of bid 50 shown in FIG. 5, bidder 22 acting as a seller offering a quantity 54-1 of 10 units of item 52-1 for sale causes the free disposal rule 70 to be associated with bidder EDD 58 of bid 50, and causes a quantity of 5 to be associated with the free disposal rule 70. The association of this quantity with the free disposal rule 70 informs the optimizing software that bidder 22 acting as a seller is willing to sell between 5 and 10 units of item I1 52-1 for bid price 56.

Also or alternatively, free disposal rule 70 can be associated with a bid taker EDD 60 of a bid taker 26. The association of the quantity of 5 with the free disposal rule 70 associated with a bid taker EDD 60 informs the optimizing software that the bid taker acting as a seller or buyer is willing to sell or buy between 5 and 10 units of item I1 52-1 for bid price 56.

Reserve Price Rule (for Bidder):

Bidder EDD 58 can also or alternatively have associated therewith a reserve price rule 72 that has a corresponding reserve price associated therewith. The reserve price associated with reserve price rule 72 informs the optimizing software the maximum price above which bidder 22 acting as a buyer will not buy item 5-1, or a minimum price below which bidder 22 acting as a seller will not sell item 52-1. In bidder EDD 58, a reserve price of $7 is associated with reserve price rule 72. This indicates that bidder 22 acting as a seller or a buyer does not wish to sell or buy any quantity of item 52-1 at a price below or above, respectively, $7.

Also or alternatively, a bid taker EDD can have associated therewith a reserve price rule that causes the optimizing software to set the maximum or minimum price the corresponding bid taker is willing to receive or pay for a quantity of an item of a bid.

Action Rule:

Bidder EDD 58 can also or alternatively have associated therewith an action rule 74 that the bidder 22 of the corresponding bid 50 can set either to buy or sell. In a forward auction or exchange, setting action rule 74 to "sell" informs the optimizing software that bidder 22 is acting as a seller and item I1 52-1 is being sold. In a reverse auction or exchange, setting action rule 74 to "buy" informs the optimizing software that bidder 22 is acting as a buyer and item I1 52-1 is being bought. In FIG. 5, action rule 74 is set to buy, indicating that bidder 22 wishes to purchase the quantity 54-1 of ten of item I1 52-1. However, if action rule 74 is set to sell, the quantity 54-1 of ten associated with bid 50 specifies the total number of units of item I1 52-1 that bidder 22 wishes to sell.

Similarly, a bid taker EDD 60 can also or alternatively have associated therewith an action rule, like action rule 74, that informs the optimizing software that the bid taker 26 is acting as a buyer or a seller.

Item Attribute Rule:

Bidder EDD 58 can also or alternatively have associated therewith one or more item attribute rules 78 that the optimizing software utilizes to complete or refine the specification for each item 52 of bid 50. For example, bidder EDD 58 can have associated therewith an item attribute field color rule 78-1, a weight rule 78-2 and/or city rule 78-3 for item 52-1. Bid 50 includes a plurality of items 52, each of which can share one or more item attribute rules 78 and/or can have one or more item attribute rules 78 associated uniquely therewith.

In FIG. 5, item attribute rule 78-1 informs the optimizing software that the only acceptable colors for each unit of item I1 52-1 are red, green and blue. Item attribute weight rule 78-2 informs the optimizing software that the minimum and maximum acceptable weights for each unit of item I1 52-1 are 10 kg and 14 kg, respectively. Item attribute city rule 78-3 informs the optimizing software the name of the city where item I1 52-1 is to be shipped from. Other item attribute rules associated with bidder EDD 58 can include width, height, purity, concentration, pH, brand, hue, intensity, saturation, shade, reflectance, origin, destination, volume, earliest pickup time, latest pickup time, earliest drop-off time, latest drop-off time, production facility, packaging and flexibility.

In response to receiving bid 50 having associated therewith bidder EDD 58 with action rule 74 is set to "buy", if a sell bid is received that specifies a color not listed in item attribute color rule 78-1, a weight outside the range listed in item attribute weight rule 78-2 or a city not listed in item attribute city rule 78-3, the optimizing software will not include the sell bid in the allocation. Otherwise, the bid shown in FIG. 5 will be processed by the optimizing software when determining the allocation.

Similarly, a bid taker EDD 60 can also or alternatively have associated therewith one or more item attribute rules, like item attribute rules 78, that inform the optimizing software that the corresponding bid taker 26 acting as a seller or a buyer is willing to sell or buy only items having the item attributes listed in a corresponding item attribute rule.

Item Adjustment Rule(s):

Bidder EDD 58 can also or alternatively have associated therewith one or more item adjustment value rules 84 that the optimizing software utilizes to process bid 50. Each item adjustment value rule 84 includes a condition and value whereupon, if the condition is valid, then the value is applied to the bid. For example, bidder EDD 58 can have associated therewith item adjustment value rules 84-1 and 84-2. Item adjustment value rule 84-1 informs the optimizing software that a value of $2 should be applied to a bid 50 for each unit of a green colored item I1 52-1. Item adjustment value field 84-2 informs the optimizing software that a value of $1 should be applied to a bid 50 for each unit of item 54-1 that has a weight greater than or equal to 11.0 kg.

Bid taker EDD 60 can also or alternatively have associated therewith one or more item adjustment value rules, like item adjustment value rule 84, that inform the optimizing software that the corresponding bid taker is willing to adjust a value paid for or received by the bid taker if a condition associated with each item adjustment value rule is satisfied.

As can be seen, the free disposal, reserve price, action, item attribute(s) and item adjustment(s) rules of bidder EDD 58 and/or bid taker EDD 60 operate on one or more items of a bid 50. However, it may also or alternatively be desirable for bidder EDD 58 and/or bid taker EDD 60 to have associated therewith rules that operate on a bid 50 as a whole versus one or more items of bid 50. Two types of rules that operate on a bid as a whole are bid attribute rule(s), which are used with bidder EDD 50, and bid adjustment rule(s), which can be used with bidder EDD 58 and/or bid taker EDD 60. These rules will now be described.

Figure 6A:
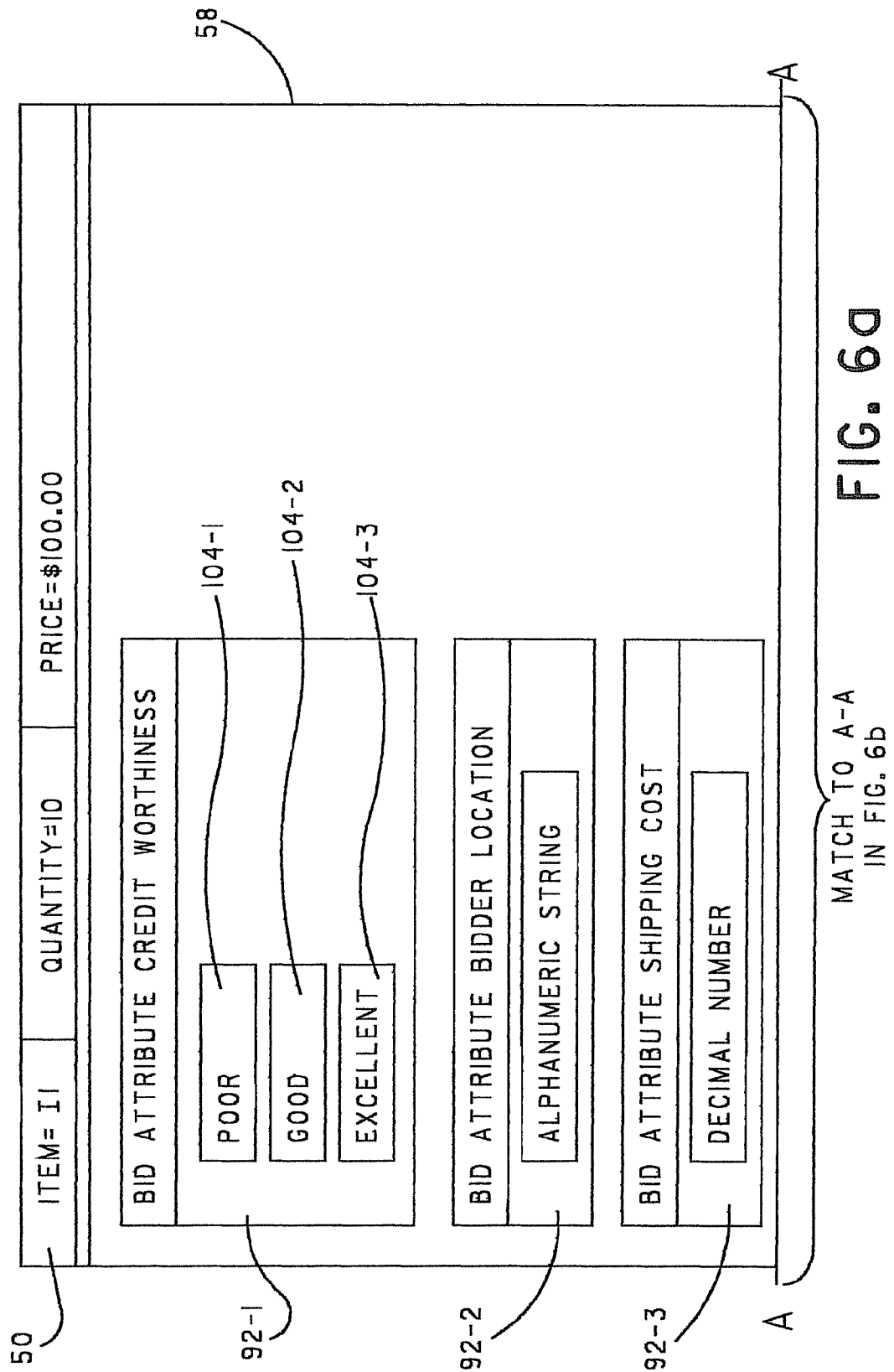
FIGS. 6a and 6b are a block diagram of a bid and an associated bidder EDD that has rules associated therewith related to bid attributes and bid adjustments.
Figure 6B:
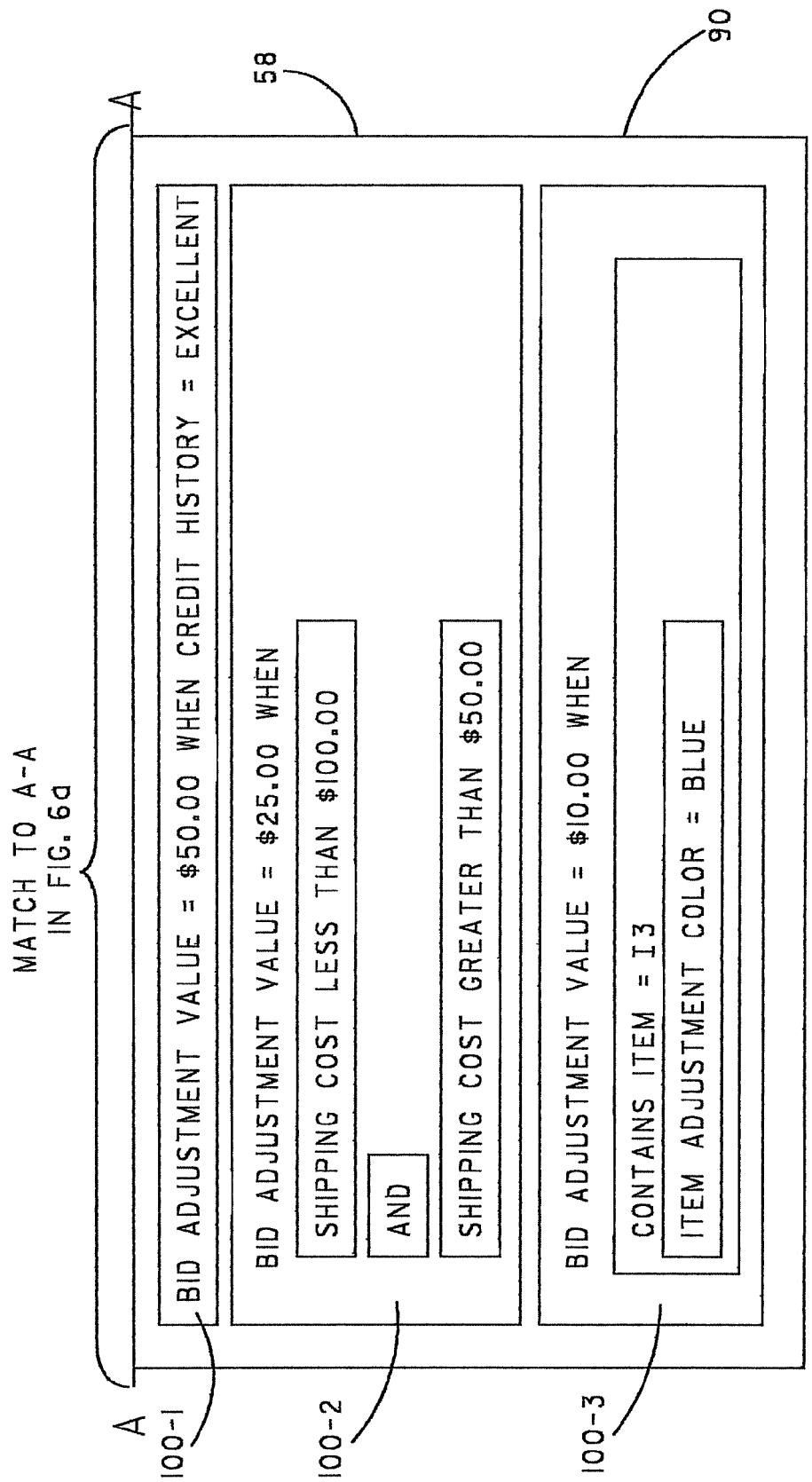

With reference to FIGS. 6a-6b, and with continuing reference to FIGS. 1-5, bidder EDD 58 can also or alternatively have associated therewith one or more bid attribute rules 92 and/or one or more bid adjustment rules 100 that quantify the effects of non-price attribute(s), e.g., item attribute(s), discussed above, and bid attribute(s), discussed hereinafter, on the determination of whether bid 50 is satisfied. These attribute(s) can be properties that allow incomplete item specification and, therefore, more economically efficient and participant-friendly market places. Any measurable, quantifiable or qualitative attribute can be defined to determine the parameters and character of the exchange.

Bid Attribute Rule:

Exemplary bid attribute rules 92 include a credit worthiness rule 92-1, a bidder location rule 92-2 and a shipping cost rule 92-3. In FIG. 6a, credit worthiness rule 92-1 includes three selections 104-1-104-3 by which a bid 50 can be set to a level of credit worthiness of the bidder. The selection of the credit worthiness "Poor" 104-1 informs the optimizing software that the bidder 22 of bid 50 has bad credit. Likewise, the selection of the credit worthiness "Good" or "Excellent" 104-2 or 104-3 informs the optimizing software that the bidder 22 of bid 50 has good or excellent credit. To avoid falsification of credit worthiness, the selection of a credit worthiness 104 associated with credit worthiness rule 92-1 is typically made by exchange manager 24. However, this is not to be construed as limiting the invention.

Location rule 92-2 can have associated therewith data, in the form of an alphanumeric string, that informs the optimizing software where the bidder of bid 50 resides. Shipping cost rule 92-3 can have associated therewith data, in the form of a decimal number, that informs the optimizing software the shipping cost of the items of bid 50. If a bid taker 26 or exchange manager 24 desires to award a certain percentage of the allocated bids to bidders living in a particular location, e.g., city, county, state, region, etc., the optimizing software can be configured to determine the allocation of the bids based on the data associated with the bid attribute bidder location rule 92-2. Similarly, the optimizing software can be configured to determine the allocation based upon the data associated with shipping cost rule 92-3. Other bid attributes that can be associated with a bid attribute rule 92 include bidder reliability, bidder reputation, bidder timeliness, freight terms and conditions, insurance terms and conditions, bidder distance and bidder flexibility.

Bid Adjustment Rule:

Bidder EDD 58 can also or alternatively have associated therewith one or more bid adjustment rules 100 that are similar syntactically to the item adjustment rules previously described. Data associated with a bid adjustment value rule 100-1 in FIG. 6b causes the optimizing software to increase the price of bid 50 by $50 when "Excellent" 104-3 associated with credit worthiness rule 92-1 is selected. If "Poor" 104-1 or "Good" 104-2 associated with credit worthiness rule 92-1 is selected, however, the optimizing software will not change the price of bid 50.

Bid adjustment value rule 100-2 can have associated therewith expressions and data that informs the optimizing software to increase the price of a bid 50 by $25 when the data associated with shipping cost rule 92-3 has a value between $50 and $100. Bid adjustment value rule 100-2 can also have associated therewith a logical operator AND as a connector between expressions. In addition to AND, the logical operators OR and NOT can also be utilized as connectors. Moreover, logical operators may be nested within other logical operators.

Bid adjustment value rule 100-2, causes the optimizing software to determine whether the actual shipping cost falls within the specified range using tests. The first test determines if the actual shipping cost is less than a first value, in this example $100. The second test determines if the actual shipping cost is greater than a second value, in this case $50. Each of these tests, i.e., "less than" and "greater than", are from a group of operators over non-price attributes. Other operators include "equal to", "less than", "less than or equal to", "greater than", "greater than or equal to", and "contains item".

The expressions and data associated with each bid adjustment value rule 100-1-100-3 are formatted as a conditional test. Namely, IF the condition holds THEN the specified adjustment is applied. It is envisioned that more complex expressions can be created that allow for dependence of whether the adjustment is applied based on multiple expressions.

Bid adjustment value rule 100-3 has a "contains item" expression associated therewith that can be utilized for two purposes. First, it tests whether or not a bid contains an item, e.g., item I3. It should be appreciated that the "contains item" expression can only be used in connection with a bid adjustment rule. In the example shown in FIG. 6b, bid adjustment value rule 100-3 informs the optimizing software to increase the price of bid 50 by $10 when bid 50 contains item I3. Second, the "contains item" expression can be utilized for specifying item attributes inside of a bid adjustment. In the example shown in FIG. 6b, bid adjustment value rule 100-3 informs the optimizing software to increase the price of bid 50 by $10 when bid 50 contains item I3 and the color of item I3 is blue. If bid 50 does not include item I3, or if item I3 is not blue, the optimizing software will not adjust the price of bid 50 based on the expressions and data associated with bid adjustment value rule 100-3.

Each bid adjustment value rule 100 is typically one of two exemplary types: additive or multiplicative. An additive bid adjustment value rule applies a positive (or negative) value to a bid if the corresponding condition holds for the bid. An additive bid adjustment value rule can either be absolute or per unit. An absolute additive adjustment is applied to a bid if the corresponding condition holds. A per unit additive bid adjustment rule is multiplied by the number of units of the item in the bid before application to the bid. A multiplicative adjustment is only used with bid adjustments, not with item adjustments. A multiplicative adjustment applies a specified percentage correction to a value of a bid if the corresponding condition holds. If the percentage is positive, the correction increases the value of the bid. If the percentage is negative, the correction decreases the value of the bid. These particular adjustments are not to be construed as limiting the invention since the use of other suitable adjustments is envisioned.

Bid taker EDD 60 can also or alternatively have associated therewith one or more bid adjustment rules 100 that inform the optimizing software that the bid taker 26 is willing to adjust, for example, a value the bid taker 26 pays or receives for one or more items if one or more conditions included in the bid taker EDD 60 are valid.

Figure 7A:
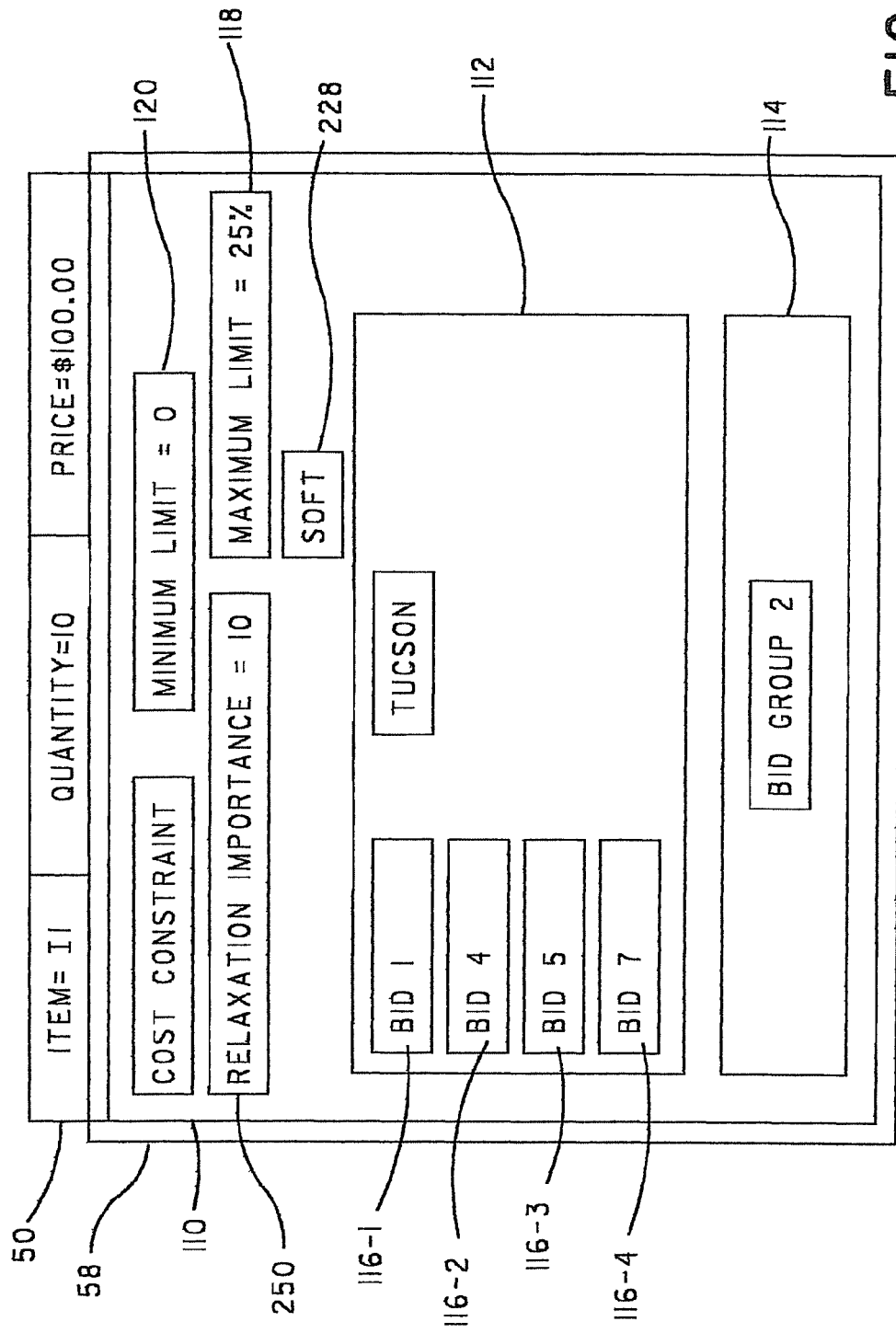
FIG. 7a is a block diagram of a bid and an associated bidder EDD that has a cost constraint rule associated therewith.
Figure 7B:
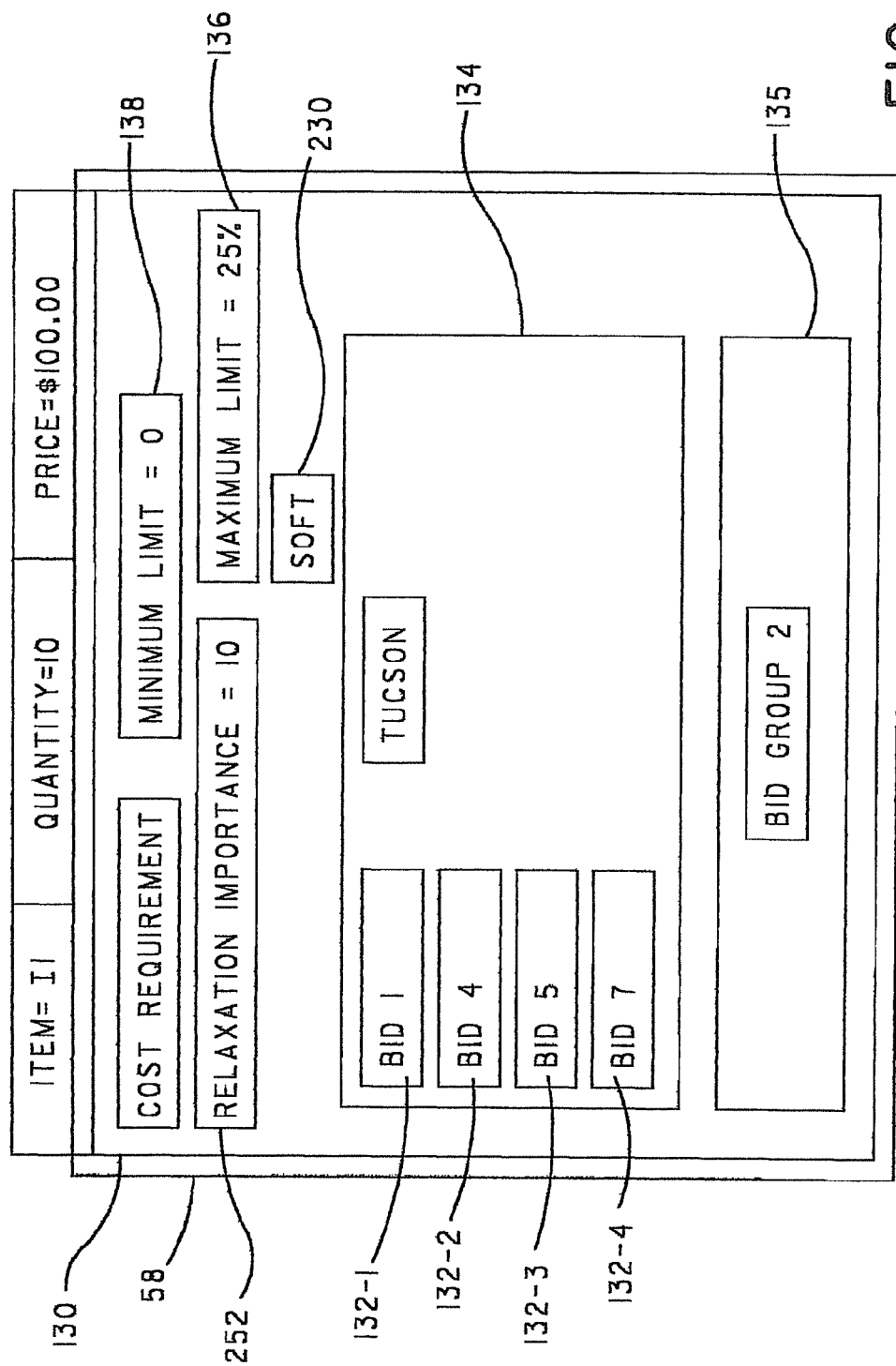
FIG. 7b is a block diagram of a bid and an associated bidder EDD that has a cost requirement rule associated therewith.

Constraint Rule:

With reference to FIGS. 7a-7b, and with continuing reference to all previous figures, bidder EDD 58 and/or bid taker EDD 60 can also or alternatively have associated therewith one or more rules that impose one or more limits on some aspect of the outcome of an allocation. For example, a rule can have data associated therewith for limiting the maximum number of winning buyers in a forward auction or the maximum number of winning sellers in a reverse auction. Another rule can have data associated therewith for limiting the currency volume sold to any one bidder. Still further, another rule can have data associated therewith for limiting the quantity of an item that a single supplier can supply. The purpose of these rules is to enable the optimizing software to determine one or more feasible allocations that meet the objectives of the market. To this end, such rules are typically associated with a bid or bid group by exchange manager 24. However, this is not to be construed as limiting the invention. These rules cause the optimizing software to determine the allocation in a manner that conforms to desired minimum and/or maximum limits. Examples of such rules include a cost constraint rule, a unit constraint rule, a counting constraint rule, a homogeneity constraint rule and a mixture constraint rule, each of which will now be described.

Cost Constraint Rule:

As shown in FIG. 7a, bidder EDD 58 can also or alternatively have associated therewith a cost constraint rule 110 that causes the optimizing software to restrict the winning allocation by establishing a limit that is based on winning bid prices and quantities. For example, cost constraint rule 110 can have associated therewith two bid groups 112 and 114. Bid group 112 is a constrained group while bid group 114 is a control group. Bid group 114 is shown in FIG. 7a for illustration purposes, but it is assumed to be an empty group. There can be many reasons to constrain a group of bids. For example, an exchange may have a need to limit the sum of the prices all of the bids from bidders in a first city. Accordingly, a bid group is established with all of the bidders from the first city. It may also be desirable to limit the number of bidders from the first city as compared to a second city.

Cost constraint rule 110 of bidder EDD 58 causes the optimizing software to compare the bid groups 112 and 114 with respect to the sums of the prices of their winning bids. If the comparison is based on percentage, then the sum of the prices of the winning bids associated with bid group 112 divided by that of the bid group 114 must be less than a value of a maximum limit 118 associated with cost constraint rule 110 and greater than a value of a minimum limit 120 associated with cost constraint rule 110. For a comparison based on percentage, to avoid division by zero (0) when no bids are associated with bid group 114 or if bid group 114 does not exist, an imaginary second bid group (not shown) can be created that contains all of the winning bids. The comparison based on percentage is then determined by dividing the sum of the quantity of items of the bids allocated to bid group 112 by that of the imaginary second bid group and comparing the solution to the maximum limit value and/or the minimum limit value.

If the comparison is absolute, then the sum of the prices of the bids associated with bid group 112 must be at least the minimum limit value more than that of the bids associated with bid group 114, and at most the maximum limit value less than that of the bids associated with bid group 112.

For example, suppose that a forward auction includes a plurality of bids where four bids 116-1-116-4 are made by bidders who fall into a group of interest, e.g., bidders from Tucson, where it is desirable to limit, based on cost, the value of the bids of this group. Suppose that cost constraint rule 110 has associated therewith a percent maximum limit 118 value of 25%. In this example, because it is desired to limit the allocation as to the value of the bids of the Tucson bidders, bids 116-1-116-4 are associated with bid group 112. This association causes the optimizing software to limit the percentage of the total allocation awarded to the bidders of these bids to the percent maximum limit 118 of cost constraint rule 110. In the example, if the sum of the values of bids 116-1-116-4 exceed 25% of the total allocation value, the solution is infeasible. If desired, cost constraint rule 110 can also or alternatively have associated therewith a minimum limit 120 which causes the optimizing software to establish a lower limit on the total allocation value.

Each cost constraint rule is strict a constraint in the sense that it must be satisfied or the allocation is infeasible. For example, a cost constraint rule can limit a bidder to receive a minimum of at least 50% of the total allocation value. Thus, if a bidder places a bid having a value of $11 in an exchange where the total allocation value of the exchange is $21, then the value of the cost constraint rule is $11/$21 or 52.38%. Since 52.38% is greater than the cost minimum limit of 50%, the allocation is feasible. However, if the cost constraint minimum is raised to 60%, the allocation is infeasible because 52.38% is less than 60%. In some situations, it may be desirable for the bidder to be required to be awarded at least 50% of the allocation, or else be awarded no allocation.

Bid taker EDD 60 can also or alternatively have associated therewith a cost constraint rule, like cost constraint rule 110, that informs the optimizing software that the corresponding bid taker 26 is only willing to buy or sell items subject one or more constraints associated with the cost constraint rule.

Cost Requirement Rule:

With reference to FIG. 7b, bidder EDD 58 can also or alternatively have associated therewith a cost requirement rule 130 that causes the optimizing software to withhold a bid or bid group from an allocation if a condition is not satisfied. Cost requirement rule 130 is syntactically similar to cost constraint rule 110. However, where cost constraint rule 110 can make a solution infeasible, cost requirement rule 130 enables the optimizing software to construct an allocation where a bid or bid group that otherwise would be allocated is withheld from the allocation because a constraint on the bid or bid group is not satisfied. Stated differently, if a cost constraint rule is not satisfied, the whole allocation is infeasible. In contrast, if a cost requirement rule is not satisfied, the bidder receives nothing, but the allocation is not necessarily infeasible.

For example, assume that a forward auction includes a plurality of bids where four bids 132-1-132-4 are made by bidders who fall into a group of interest, e.g., bidders from Tucson, where it is desired to limit, based on cost, the value of the bids of the particular bidders. Suppose that cost requirement rule 130 has associated therewith a percent maximum limit 136 value of 25%. In this example, because it is desired to limit the allocation as to the value of the bids of the Tucson bidders, bids 132-1-132-4 are associated with bid group 134. If the sum of the values of bids 132-1-132-4 exceeds 25% of the total allocation value, the Tucson bidders receive nothing in the allocation. In order for the bids included in bid group 134 to be allocated, the percent values of these bids must be less than the value of the percent associated with maximum limit 136 of cost requirement rule 130. If desired, cost requirement rule 130 can also or alternatively have associated therewith a minimum limit field 138 which causes the optimizing software to set a lower limit on the percent of the total allocation value.

Bid taker EDD 60 can also or alternatively include a cost requirement rule, like cost requirement rule 130, that informs the optimizing software that the corresponding bid taker 26 is only willing to buy or sell one or more items if one or more constraints of bidder EDD 60 are satisfied. If the one or more constraints of bidder EDD are not satisfied, the bid taker 26 receives nothing, but the allocation is not necessarily infeasible.

Figure 8A:
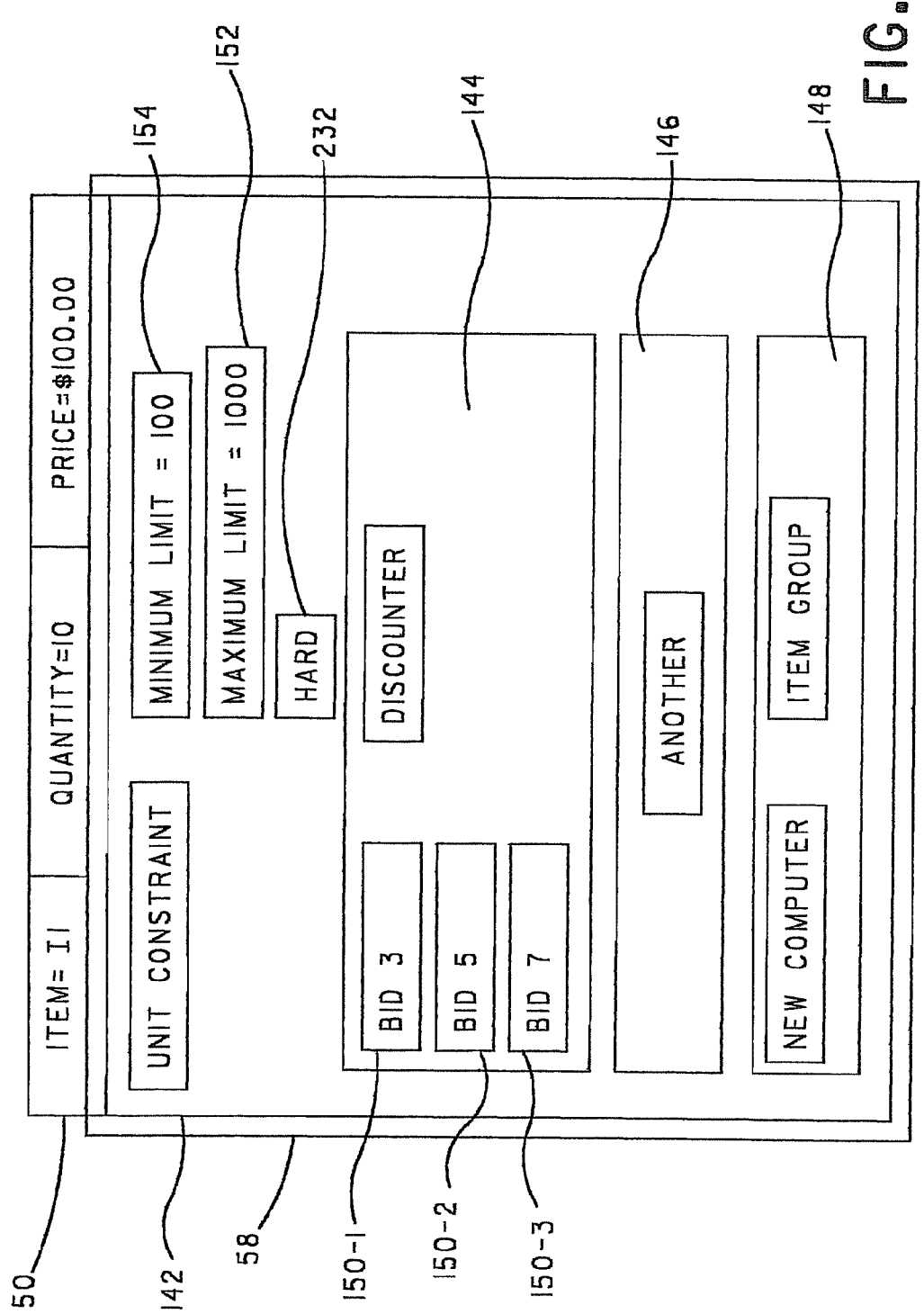
FIG. 8a is a block diagram of a bid and an associated bidder EDD that has a unit constraint rule associated therewith.

Unit Constraint Rule:

With reference to FIG. 8a, bidder EDD 58 can also or alternatively have associated therewith a unit constraint rule 142 that causes the optimizing software to restrict the winning allocation by setting a limit which is based on a quantity of items that are bought and/or sold in winning bids. For example, unit constraint rule 142 can have bid groups 144 and 146 and an item group 148 associated therewith. Suppose that a forward auction includes a plurality of bids where three bids 150-1-150-3 are made by one bidder where it is desired to limit the quantity of items awarded to that bidder. Moreover, suppose that the bidder is a buyer for a large computer discounter and that each of the three bids is for as many units as are available of a new computer. Furthermore, suppose that 2000 of these computers are available and that there is a need to distribute some of the computers to other buyers in order to facilitate the development of a wide customer base. Lastly, suppose that it is desired to limit the quantity of computers awarded to the bidder of bids 150-1-150-3 to one-half of the available computers, or 1000 computers. Since it is desired to limit the bidder, bids 150-1-150-3 are included in bid group 144 and the item associated with bids 150-1-150-3, i.e., a new computer, is included in item group 148. A suitable value, in this example 1000, is associated with a maximum limit 152 of unit constraint rule 142 to limit the maximum quantity of computers the bids included in bid group 144 are awarded. In this example, bids 150-1-150-3 of bid group 144 can be awarded no more than 1000 units. When the allocation is returned, the computer discounter is allocated no more than 1000 units by the optimizing software. Also or alternatively, a suitable value, in the example shown in FIG. 8*a*, 100, is associated with a minimum limit 154 of unit constraint rule 142 for limiting the minimum quantity of units that are allocated to the bids included in bid group 144. In this example, item group 148 includes only computers. However, any part or item that would be useful to limit the allocation can also or alternatively be included in item group 148 or a corresponding item group.

As with cost constraint rules, there are two types of comparisons that can be made, namely, an absolute comparison, as in the foregoing example of limiting the number of computers allocated to a computer discounter, and a comparison based on percentage. In a comparison based on percentage, the sum of the quantity of items of the allocated bids in bid group 144 divided by the sum of the items of the allocated bids in a bid group 146 must be less than a maximum percentage (not shown) and/or greater than a minimum percentage (not shown). The maximum percentage and the minimum percentage can also be the same if the allocation of an exact percentage of items is desired. To avoid division by zero (0) when bid group 146 does not exist or bid group 146 does not include any bids, a virtual second bid group (not shown) can be created that contains all of the winning bids. The comparison based on percentage is then determined by dividing the sum of the quantity of items of the winning bids of bid group 144 by that of the virtual second bid group and comparing the solution to the value associated with the maximum percentage and/or the minimum percentage.

For example, assume it is desired to limit the percentage of items awarded the bids included in bid group 144. Accordingly, a desired percentage (not shown) is associated with maximum limit 152 of unit constraint rule 142. This percentage causes the optimizing software to limit the percentage of available computers allocated to bids 150-1-150-3 to the desired percentage.

Unit constraint rules, like cost constraint rules, are strict in the sense that they must be satisfied or the allocation will be infeasible. For example, a unit constraint rule can require a bidder to receive at least 1000 units of an item in an auction. Thus, if a bidder places two bids that are allocated 500 units and 1000 units of the item, since this bidder satisfied the 1000 unit requirement, the allocation is feasible. However, if the bidder places two or more bids, but the total number of units of the item of all the bidder's bids does not add up to 1000 units, then the solution is infeasible, and there is no allocation to the bidder.

Bid taker EDD 60 can also or alternatively include a unit constraint rule, like unit constraint 142, that informs the optimizing software that the corresponding bid taker 26 wishes to buy or sell no more and/or no less than a certain number of units of one or more items.

Unit Requirement Rule:

With reference to FIG. 8*b*, bidder EDD 58 can also or alternatively have associated therewith a unit requirement rule 160 that enables the optimizing software to allocate a quantity of zero to a bidder to provide a winning allocation. Unit requirement rule 160 is syntactically similar to a unit constraint rule 142. However, where unit constraint rule 142 makes the solution infeasible, unit requirement rule 160 enables a quantity of zero to be allocated.

For example, suppose a forward auction includes a plurality of bids where three bids 168-1-168-3 are made by a bidder to whom it is desired to limit the quantity of awarded items. Suppose that the bidder is the buyer from the large computer discounter and the three bids are for new computers. For this exchange, there is a need to sell all the computers as quickly as possible. Accordingly, it is desired to sell a large quantity of the available computers to the computer discounter. Unit requirement rule 160 causes the optimizing software to allocate at least 1000 computers to the bidder. Since it is desired to limit the bidder, unit requirement field 160 can have associated therewith a bid group 162 that includes bids 1684-168-3 placed by the bidder. The items for this example, i.e., new computers, are associated with an item group 166. The number of units of the item associated with item group 166 that are allocated to the bids included in bid group 162 is limited to the value, e.g., 1000, of minimum limit 170 of unit requirement rule 160 and by the value, e.g., 0, associated with a maximum limit 172 of unit requirement rule 160. In this example, the bidder will be allocated 1000 or more computers, or no computers. If the bidder is allocated no computers, however, the allocation is still feasible.

Bid taker EDD 60 can also or alternatively include a unit requirement rule, like unit requirement rule 160, that informs the optimizing software that the corresponding bid taker 26 is willing to buy or sell a maximum and/or minimum quantity of units of one or more items.

Figure 9A:
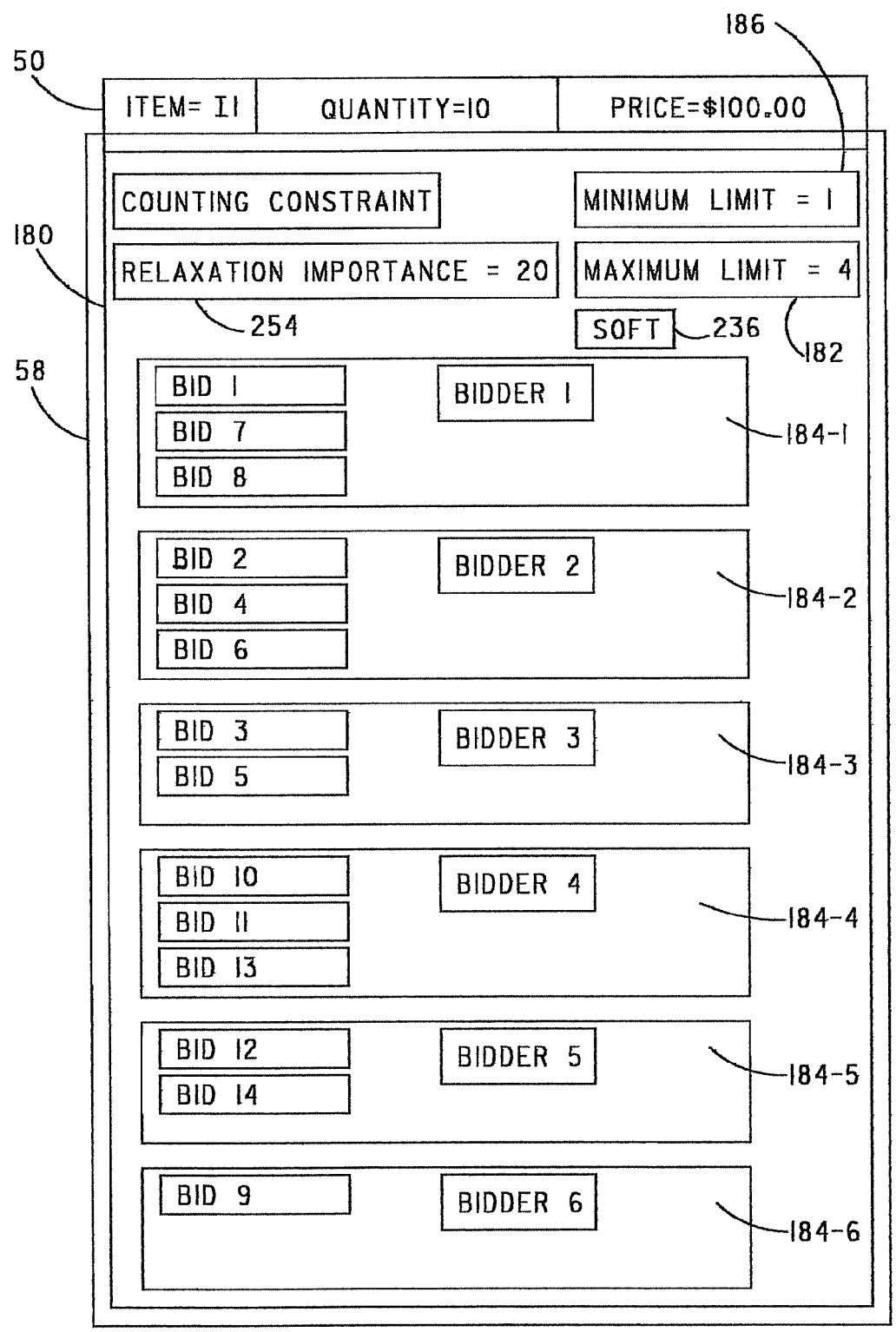
FIG. 9a is a block diagram of a bid and an associated bidder EDD that has a counting constraint rule associated therewith.

Counting Constraint Rule:

With reference to FIG. 9*a*, bidder EDD 58 can also or alternatively have associated therewith a counting constraint rule 180 that enables the optimizing software to control outcome parameters. Outcome parameters are those besides bid and item allocations and net exchange revenue. An example of an outcome parameter includes an imposed constraint, such as an award of a minimum percentage of an allocation to minority films. There may also be a market domination concern that compels an award of a maximum percentage of an allocation to one or a group of bidders that may be specified. Another common example is to ensure that a certain percentage of the business goes to a specific bidder, because of a long-standing business relationship. Still another example is to condition an award to a bidder of at least a certain percentage of the allocation to avoid giving the bidder such a small amount of business that it does not cover the bidder's operating expenses.

For example, counting constraint rule 180 can have a value of four associated with a maximum limit 182 for controlling the maximum number of winning bidders. In FIG. 9*a*, each of six bidders has placed a number of bids in the auction. The bids of each bidder are inserted into bid group 184-1-184-6, with bid group 184-1 including all the bids placed by bidder 1, with bid group 184-2 including all the bids placed by bidder 2, and so forth. The value of four associated with the maximum limit 182 constrains the allocation made by the optimizing software to the bids included in four of the six bid group 184-1-184-6. Since each bid group 184 in this example represents one bidder, counting constraint rule 180 limits the number of winning bidders.

With continuing reference to FIG. 9*a*, suppose that value of zero is associated with the maximum limit 182 of counting constraint rule 180 and a value of four is associated with a minimum limit 186 of counting constraint rule 180. This will cause the winning allocation to include the bids included in at most four of bid groups 184-1-184-6. Moreover, both the maximum limit 182 and the minimum limit 186 may include values wherein the desired number of winning bidders falls within the range of values.

Bid taker EDD 60 can also or alternatively include a counting constraint rule, like counting constraint rule 180, that informs the optimizing software that the corresponding bid taker 26 is willing to buy or sell bids subject to one or more constraints included in the counting constraint rule.

Figure 9B:
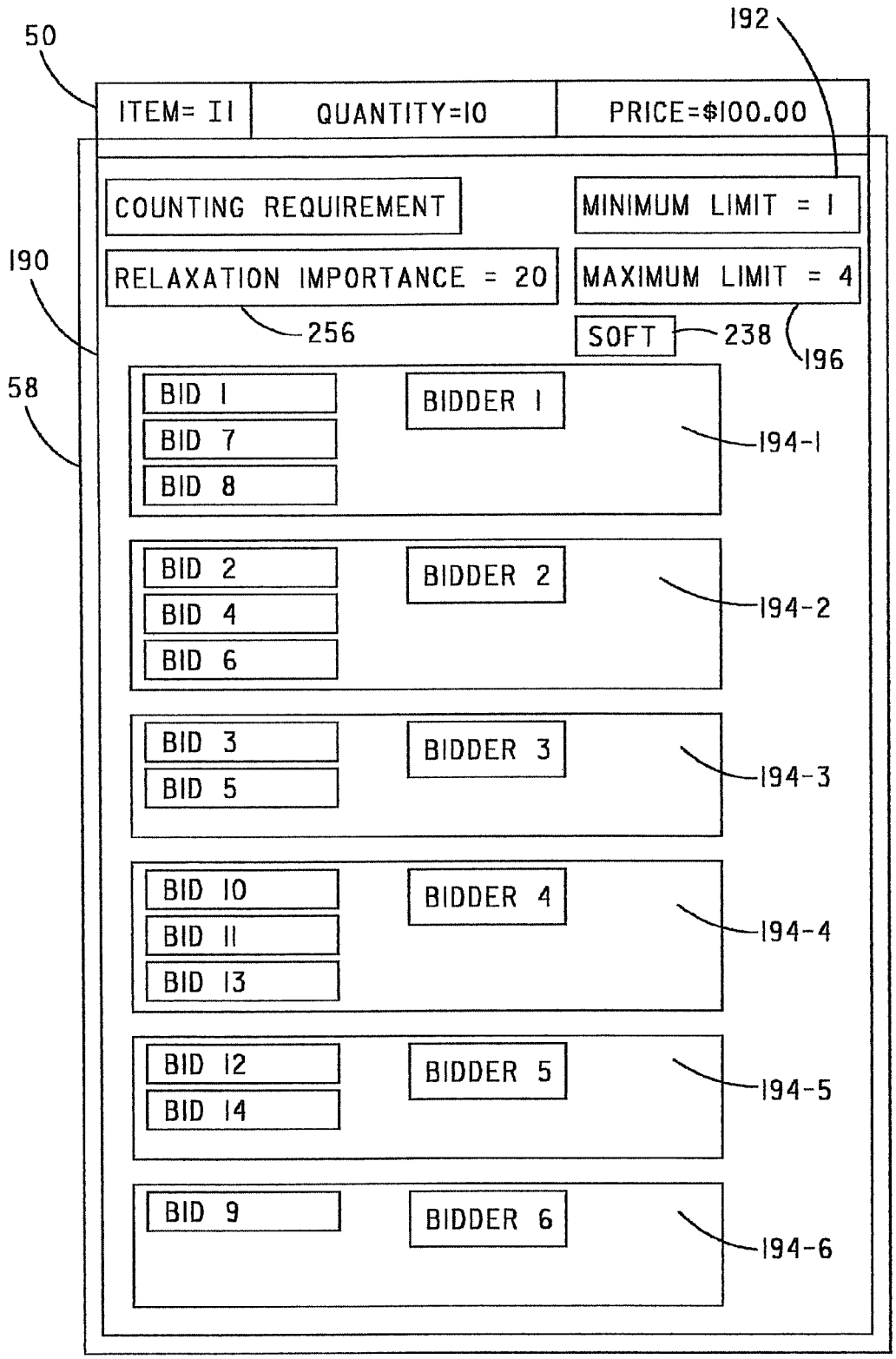
FIG. 9b is a block diagram of a bid and an associated bidder EDD that has a counting requirement rule associated therewith.

Counting Requirement Rule:

With reference to FIG. 9b, bidder EDD 58 can also or alternatively have associated therewith a counting requirement rule 190. The difference between a counting constraint rule and a counting requirement rule is that the counting requirement rule can have a minimum limit value greater than zero, but also allow a value of zero. For example, suppose that counting constraint rule 180 in FIG. 9a has a value of four associated with its minimum limit 186. Then, four or more of bid groups 184-1-184-6 must be allocated or the solution is infeasible. In contrast, suppose counting requirement rule 190 shown in FIG. 9b has a value of four associated with its minimum limit 192. Then, at least four of bid groups 194-1-194-6 must be allocated or none of bid groups 194-1-194-6 will be included in the allocation. In either event, however, the allocation is still feasible.

Bid taker EDD 60 can also or alternatively include a counting requirement rule, like counting requirement rule 190, that informs the optimizing software that the corresponding bid taker 26 is willing to buy or sell bids subject to one or more constraints included in the counting requirement rule.

Figure 10:
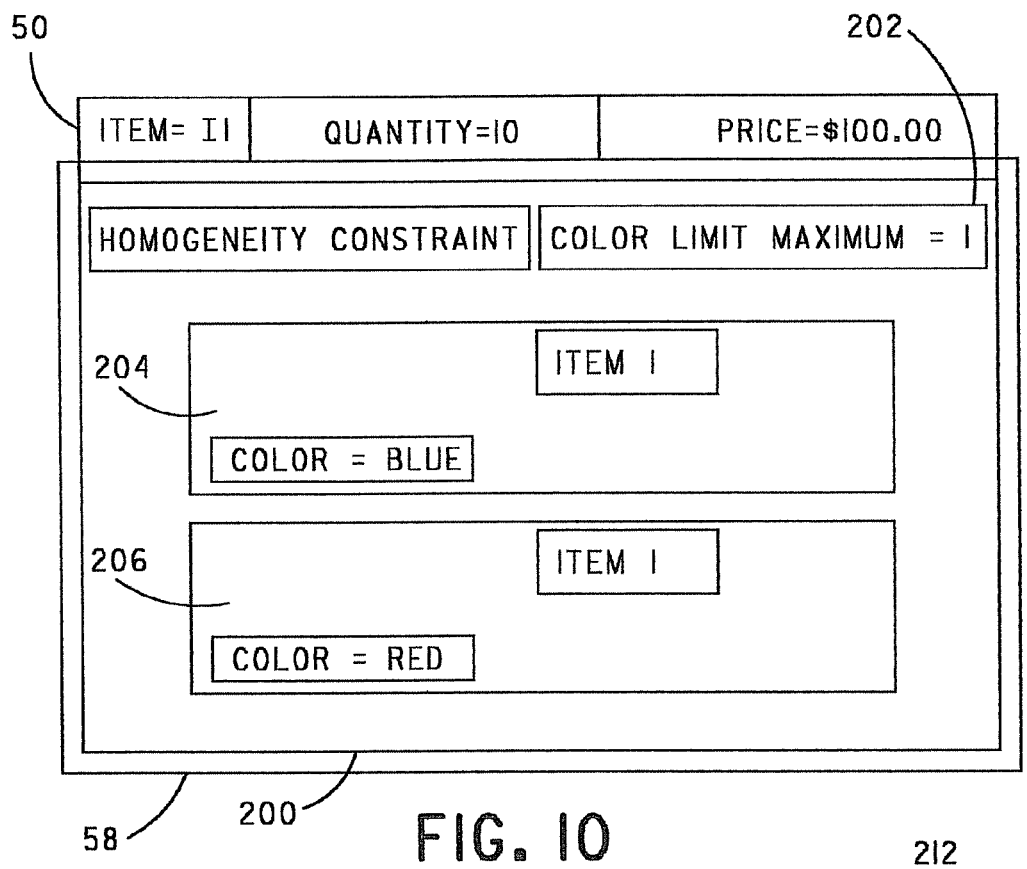
FIG. 10 is a block diagram of a bid and an associated bidder EDD that has a homogeneity rule associated therewith.

Homogeneity Constraint Rule:

With reference to FIG. 10, bidder EDD 58 can also or alternatively have associated therewith a homogeneity constraint rule 200 that enables the optimizing software to place one or more limits on the allocation. With a homogeneity constraint rule, a limit based on an item attribute or a bid attribute can be placed on one or more bids. For example, in FIG. 5, item I1 52-1 has an item attribute color(s) rule 78-1 associated therewith. Suppose, however, homogeneity constraint rule 200 is needed to limit the number of represented colors in all of the specified items of awarded bids, where the award of an item of green color is irrelevant, even though it is one of the colors for that item attribute. Accordingly, homogeneity constraint rule 200 can be created having a value of one associated with a color limit maximum 202 of homogeneity constraint rule 200. This value causes the optimizing software to limit the colors included in the allocation to one color.

In response to receiving homogeneity constraint rule 200, the optimizing software would cause the allocation to include items having only one of the colors of blue and red, but any number of green items since green was not included in an item attribute group of homogeneity constraint rule 200. Thus, blue items or red items, and/or green items may be allocated. As can be seen, homogeneity constraint rule 200 ensures that no more than one of the specified colors will appear in the allocation. Since only the colors specified in homogeneity constraint rule 200 are considered for purposes of homogeneity, any other color, in this example green, associated with color(s) item attribute rule 78 in FIG. 5 can also appear in the allocation. A color limit minimum (not shown) can also or alternatively be associated with homogeneity constraint rule 200 for limiting the minimum number of colors of items awarded in the allocation or to establish a range of an item colors awarded in an allocation.

The foregoing example shows one item per item attribute groups 204, 206. However, multiple items may appear in each item attribute groups 204, 206. These items form an equivalence class for the purpose of homogeneity. For example, the color cyan can be considered to be the same as the color blue when assessing homogeneity by adding cyan to item attribute group 204.

Bid taker EDD 60 can also or alternatively include a homogeneity constraint rule, like homogeneity constraint rule 200, that causes the optimizing software to place one or more limits on the allocation.

Figure 11:
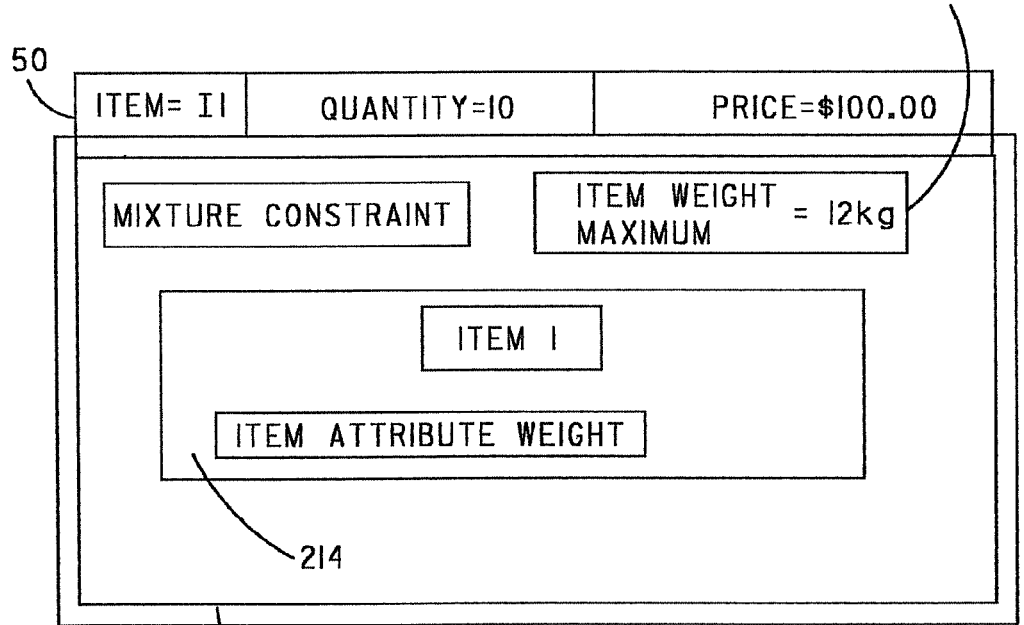
FIG. 11 is a block diagram of a bid and an associated bidder EDD that has a mixture constraint rule associated therewith.

Mixture Constraint Rule:

With reference to FIG. 11, bidder EDD 58 can also or alternatively have associated therewith a mixture constraint rule 210 that enables the optimizing software to mix attributes of interest. In the previous example, homogeneity constraint rule 200 limited by maximum or minimum the different colors represented in all of the specified items of all of the bids of the allocation. Mixture constraint rule 210 limits by attribute, similar to homogeneity constraint rule 200, but also enables the optimizing software to select any combination of bids or items in fulfilling that limit. For example, mixture constraint rule 210 can have a value of twelve kg associated with an item weight maximum 212 for an Item 1 associated with an item attribute weight 214 of mixture constraint rule 210. The value associated with item weight maximum 212 causes the optimizing software to limit the weight of all units of Item 1 associated with item attribute weight 214 to an average of no more than twelve kg. Mixture constraint rule 210 allows heterogeneity in an allocation providing the average is within specified limits. Therefore, in this example, suppose it is desired to have a mixture of weights, providing the average weight is no more than twelve kg. With mixture constraint rule 210, it does not matter how the various weights are mixed. The average value, which is constrained by the optimizing software in response to mixture constraint rule 210, may be determined from any one or a combination of items. Mixture constraint rule 210 may also be price weighted, i.e., the prices of each bid will weight the average. For example, an attribute, e.g., item weight, on a $2 bid will have twice the effect the same attribute has on a $1 bid.

In the foregoing example, mixture constraint rule 210 is described as enabling the optimizing software to operate on an item attribute, i.e., weight. Mixture constraint rule 210, however, can also or alternatively be operative on a bid attribute of a bid group. Examples of exemplary bid attributes that mixture constraint rule 210 can cause the optimizing software to operate on are described above in connection with FIGS. 6a and 6b.

Bid taker EDD 60 can also or alternatively have associated therewith a mixture constraint rule, like mixture constraint rule 210, that enables the optimizing software to mix attributes of interest to the bid taker.

Figure 12:
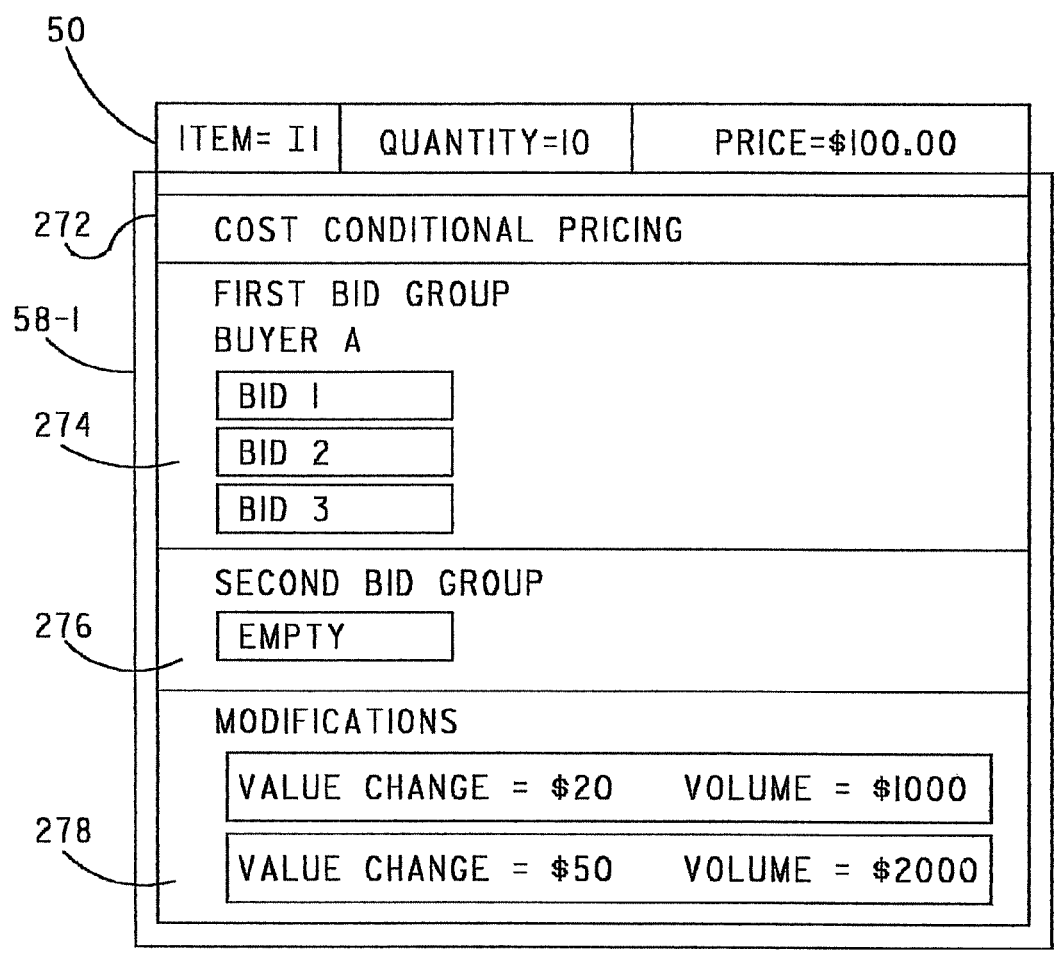
FIG. 12 is a block diagram of a bid and an associated bidder EDD that has a cost conditional pricing rule associated therewith.

Cost Conditional Pricing Rule:

With reference to FIG. 12, bidder EDD 58 can also or alternatively have associated therewith a cost conditional pricing rule 272 that causes the optimizing software to modify an outcome of a forward auction, a reverse auction or an exchange based on value limit(s). For example, two bid groups 274 and 276 can be associated with cost conditional pricing rule 272. Bid group 274 is a constrained bid group while bid group 276 is a control bid group. Bid group 276 is created for illustration purposes, but it is assumed that it is empty. Cost conditional pricing rule 272 is similar to cost constraint rule 110, except that cost conditional pricing rule 272 causes the optimizing software to utilize one or more cost constraints associated with a modifications group 278 of cost conditional pricing rule 272 to adjust the solution rather than forcing the solution to obey other established constraints. Advantages of changing a price outcome of an exchange include, for example, the optimizing software giving a discount of $20 to a buyer in a forward auction if the buyer spends more than $1000 or a discount of $50 if the buyer spends more than $2000.

Bid taker EDD 60 can also or alternatively have associated therewith a cost conditional pricing rule, like cost conditional pricing rule 272, that includes one or more cost constraints that the optimizing software utilizes to modify the allocation in a forward auction, a reverse auction or an exchange based on value limit(s).

Figure 13:
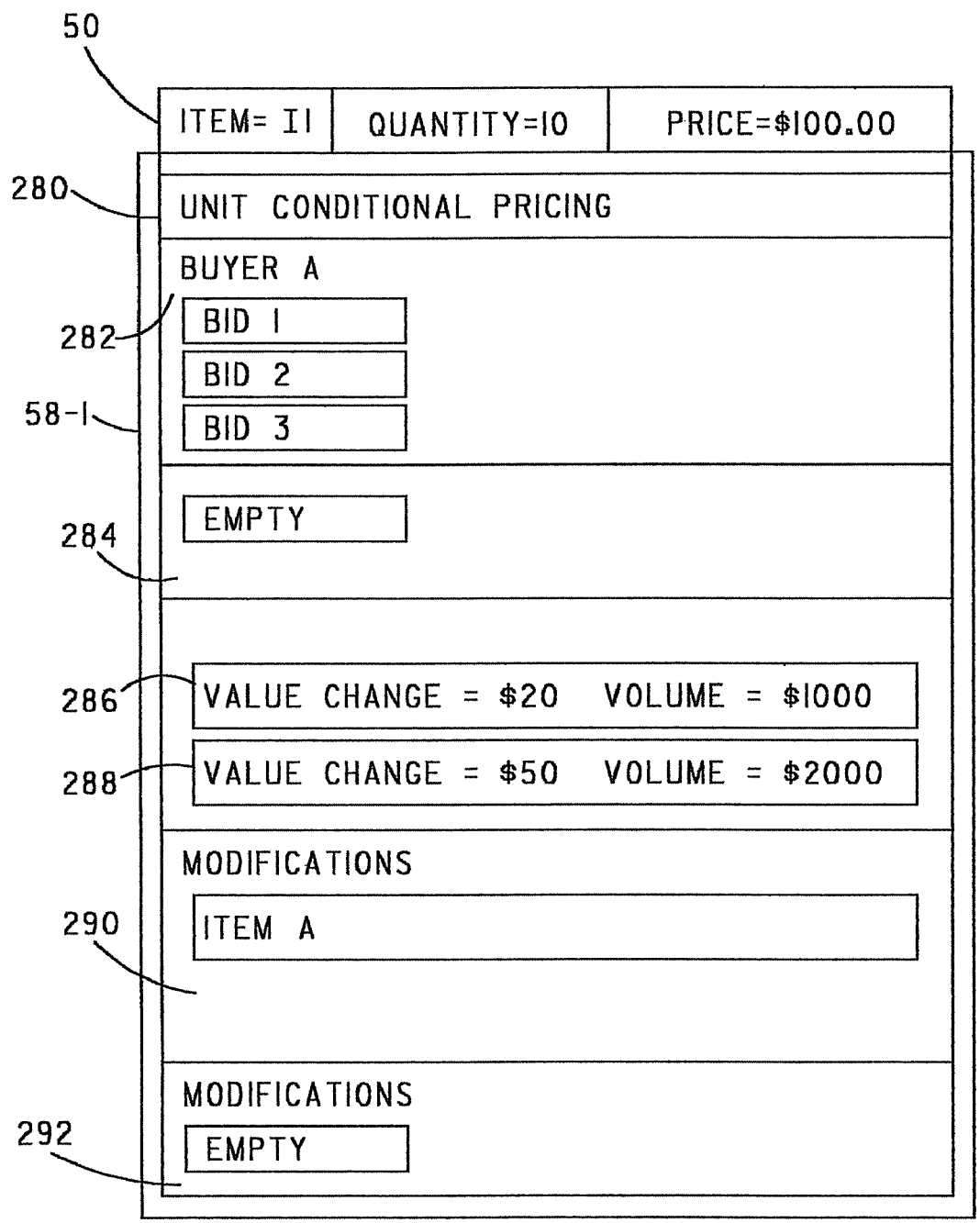
FIG. 13 is a block diagram of a bid and an associated bidder EDD that has a unit conditional pricing rule associated therewith.

Unit Conditional Pricing Rule:

With reference to FIG. 13, bidder EDD 58 can also or alternatively have associated therewith a unit conditional pricing rule 280 that causes the optimizing software to modify the value outcome of a forward auction, a reverse auction or an exchange based on a difference in unit volume of two or more bids or bid groups of two or more bidders. For example, two bid groups 282 and 284 can be associated with unit conditional pricing rule 280. Bid group 282 is a constrained group while bid group 284 is a control group. In this example, bid group 284 is an empty group. Unit conditional pricing rule 280 causes the optimizing software to operate in a manner similar to unit constraint rule 142 in FIG. 8a, except that unit conditional pricing rule 280 adjusts the solution rather than forcing the solution to obey other constraint(s). For example, suppose bid group 282 includes all of the bids associated with buyer A and constraints or condition modifiers 286 and 288 are associated with unit conditional price rule 280. The optimizing software determines a difference in unit volume between the item(s) associated with an item A associated with a modifications group 290, traded by buyer A, associated with bid group 282, and the item(s) included in a modifications group 292 traded by the bidder(s), if any, associated with bid group 284. If the difference in unit volume awarded to the bidder(s) of bid group 282 and the unit volume awarded to the bidder(s) of bid group 284 is greater than the unit volume included in condition modifier 286, a discount of $20 is given to the bidder(s) associated with the bid group 282 or 284 having the greater volume. If the difference is greater than the unit volume included in condition modifier 288, a discount of $50 is given to bidder(s) associated with the bid group 282 or 284 having the greater volume.

In the example shown in FIG. 13, since modifications group 292 and bid group 284 are empty, the unit volume is the number of units of item A listed in modifications group 290 traded by the bidder associated with bid group 282. Unit conditional pricing rule 280 uses the difference in the unit volumes included in bid groups 282 and 284. In this example, since bid group 284 includes no bids, its unit volume defaults to empty and the difference is simply the unit volume of the bids of bid group 282 for buyer A. If the unit volume of the bids of bid group 282 is 1000 units or more than the unit volume of the bids of bid group 284, the optimizing software determines that condition modifier 286 is satisfied and a discount of $20.00 is given. If the unit volume included in bid group 282 is 2000 units or more than the unit volume included in bid group 284, the optimizing software determines that condition modifier 288 is satisfied and a discount of $50.00 is given.

Bid taker EDD 60 can also or alternatively have associated therewith a unit conditional pricing rule, like unit conditional pricing rule 280, that includes one or more conditions that the optimizing software utilizes to modify the value outcome of a forward, a reverse auction or an exchange based on a difference in unit volume of two or bids or bid groups of two or more bidders.

Quote Request Rule:

Bidder EDD 58 can also or alternatively have associated therewith a quote request rule (not shown) that causes the optimizing software to treat the corresponding bid 50 as a "quote request", whereupon the optimizing software returns to the bidder of the bid a price where the bid would just be included in an allocation, i.e., the least competitive price. Thereafter, if the bidder wishes to place one or more bids or associate one or more bids with a bid group that the optimizing software considers for inclusion in an allocation, such bid can be made or such bid group can be formed separately from the quote request rule. Thus, the optimizing software treats a quote request rule like a bid.

Bid taker EDD 60 can also or alternatively have associated therewith a quote request rule that causes the optimizing software to return to the corresponding bid taker 26 a price of a bid that would just be included in an allocation.

As can be seen, bidder EDD 58 and/or bid taker EDD 60 can include one or more of the foregoing rules that the optimizing software can utilize to determine an allocation. Next, the rules that are typically associated uniquely with bid taker EDD 60 will be described. These rules include an objective rule, a constraint relaxer rule and a feasibility obtainer rule.

Figure 14:
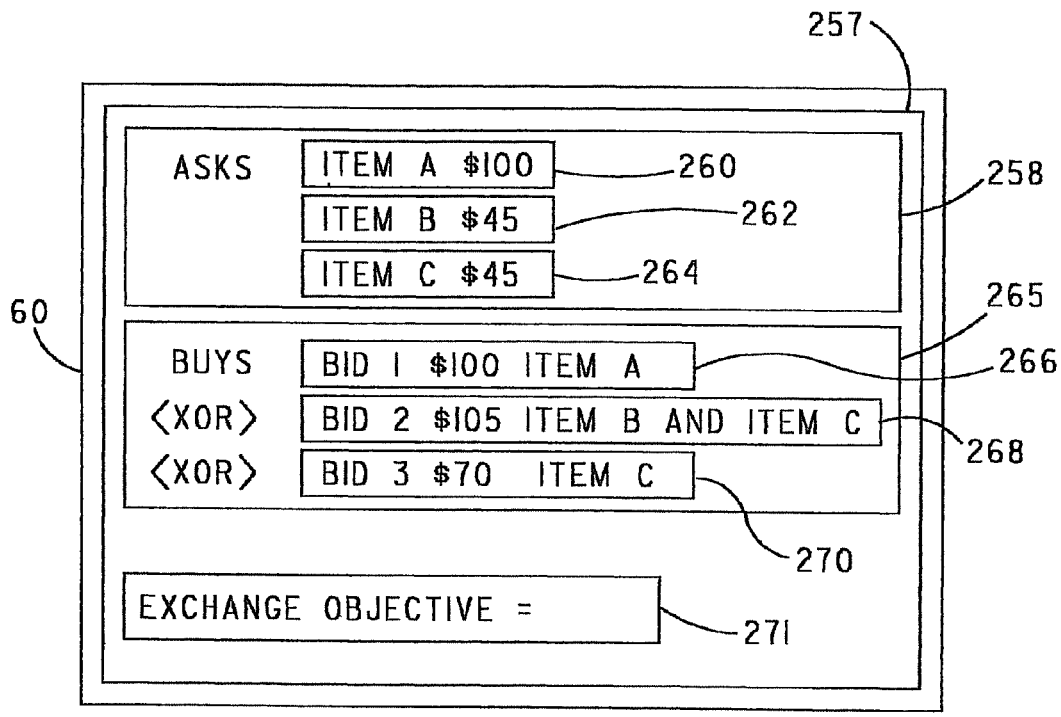
FIG. 14 is a block diagram of a bid taker EDD that has an objective rule associated therewith.

Objective Rule:

With reference to FIG. 14, bid taker EDD 60 can have associated therewith an objective rule 257 that establishes a maximization or minimization goal that the optimizing software utilizes to determine an allocation value for an exchange. Each maximization goal has one specific meaning for forward auctions, reverse auctions, and exchanges. Each minimization goal has one specific meaning for a reverse auction.

Objective rule 257 can comprise one or more rules related to one or more objectives of an exchange. These exchange objectives include surplus, traded bid volume, traded ask volume or traded average volume. Each of these rules expresses a maximization goal for a forward auction or exchange, or a minimization goal for a reverse auction. The following table shows the rule(s) associated with objective rule 257 for the foregoing objectives of the exchange.

| Objective | Forward Auction | Reverse Auction | Exchange |
| --- | --- | --- | --- |
| Surplus | sum of accepted bids less the sum of their item reserve prices | N/A | sum of accepted bids less sum of accepted asks |
| Traded bid | sum of accepted bids | N/A | sum of accepted bids |
| Traded ask | sum of item reserve prices of accepted bids | sum of accepted asks | sum of accepted asks |
| Traded average | average of the sum of accepted bids and sum of their item reserve prices | N/A | average of the sum of accepted bids and sum of accepted asks |

The rules associated with each of the foregoing objectives enables the optimizing software to perform a specific optimization. Each objective is useful because it enables specification of exactly what is wanted in a forward auction, reverse auction or exchange. For example, suppose one unit of three items, namely, item A 260, item B 262 and item C 264, for sale at prices of $100, $45 and $45, respectively, are included in an ask group 258 associated with objective rule 257 of bid taker EDD 60. These are ask bids since the three items are being sold. Moreover, suppose that a buy group 265 associated with objective rule 257 includes three buy bids: Bid 1 266 for Item A for $100; Bid 2 268 for Items B and C for $105; and Bid 3 270 for Item C for $70. Furthermore, suppose that these three buy bids are logically connected by XOR (exclusive OR)

logical operators whereupon only one of Bids 266, 268 and 270 will be allocated by the optimizing software.

If an exchange objective 271 of objective rule 257 is set to "maximize traded ask", Bid 1 266 is allocated by the optimizing software since it has the maximum ask value, i.e., $100. If exchange objective 271 is set to "maximize traded bid", Bid 2 268 is allocated by the optimizing software since it has the maximum bid value, i.e., $105. If exchange objective 271 is set to "maximize surplus", Bid 3 270 is allocated by the optimizing software since it has the largest surplus value, i.e., $70-$45=$25. Lastly, if exchange objective 271 is set to "maximize traded average", either Bid 1 for Item A 260 at $100, or Bid 2 for Items B and C 262 and 264 at $105 is allocated by the optimizing software. Exchange objective 271 can also be set to "maximize the number of winning bidders" or "maximize the number of losing bidders" in an allocation. In each of the foregoing settings, the word "maximize" can be replaced with "minimize" whereupon the optimizing software will be provided with the corresponding rule.

Figure 15:
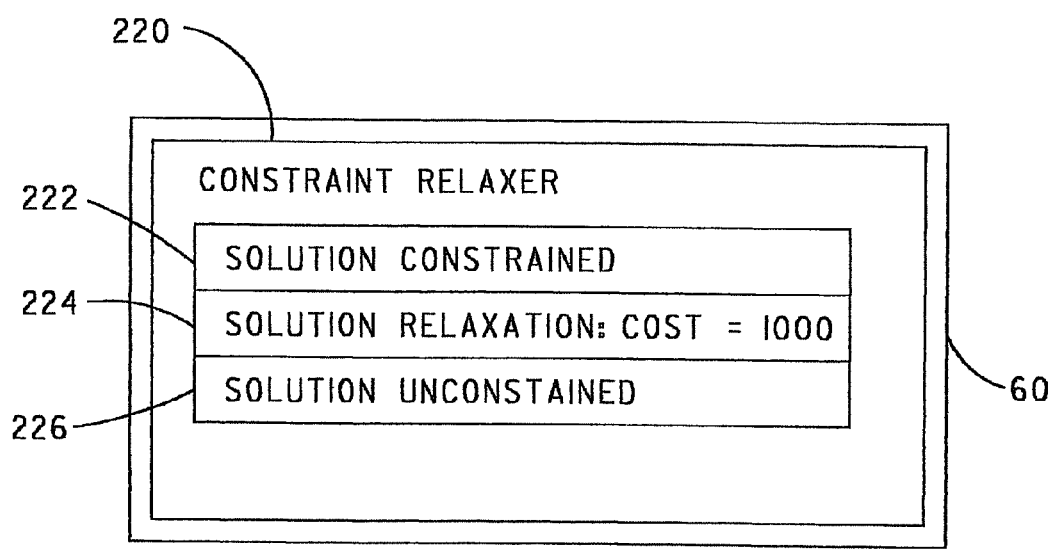
FIG. 15 is a block diagram of a bid taker EDD that has a constraint relaxer rule associated therewith.

Constraint Relaxer Rule:

With reference to FIGS. 15 and 16, many of the rules described thus far have the capacity to be relaxed by a bid taker 26. Accordingly, bid taker EDD 60 can also or alternatively have associated therewith a constraint relaxer rule 220. The ability to relax a rule has two purposes, namely, to obtain candidate allocations when the original problem does not have a feasible allocation, and to search for alternative allocations when there is a feasible allocation. Such alternative allocations can illustrate the impact on the allocation solution as more important rules are relaxed. The importance of each rule can depend on the relative relaxation importance weight assigned thereto. These weights are dependent on the weights and types of each rule in an exchange.

FIG. 15 illustrates a constraint relaxer rule 220 that includes one or more possible desired solutions 222, 224 and 226 that can be applied by the optimizing software to determine an exchange allocation. For example, selecting constrained solution 222 causes the optimizing software to search for an allocation with all the constraints in place. Selecting unconstrained solution 226 causes the optimizing software to search for an allocation with no constraints in place. Between constrained and unconstrained solutions 222 and 226, there is relaxation solution 224. Selecting relaxation solution 224 causes the optimizing software to search for one or more allocations as a function of "soft" and/or "hard" properties. For example, in FIGS. 7a and 9a, "soft" properties 228 and 236 are associated with cost constraint rule 110 and counting constraint rule 180, respectively, while in FIG. 8a, a "hard" property 232 is associated with unit constraint rule 142. When relaxation solution 224 is selected in constraint relaxation rule 220, the optimizing software obtains a feasible solution by relaxing cost constraint rule 110 and counting constraint rule 180 while maintaining unit constraint rule 142. In this example, the use of "hard" property 232 in FIG. 8a assumes that unit constraint rule 142 is so important that to relax it will create a useless allocation.

Selecting constrained solution 222 causes the optimizing software to create the exemplary constrained allocation 240 shown in FIG. 16. Namely, a fully constrained allocation for which either a feasible, market desirable solution or an infeasible solution exists. In other words, constrained allocation 240 shows the bids that should be awarded given all of the bids and all of the rules associated with bidder EDDs 58 and/or bid taker EDDs 60. In the example shown in FIG. 16, constrained allocation 240 shows three winning bids with an allocation value of $1,000.

In contrast, selecting relaxation solution 224 causes the optimizing software to relax each rule that has a "soft" property associated therewith to obtain the exemplary relaxation allocation 242 shown in FIG. 16. Selecting unconstrained solution 226 causes the optimizing software to relax all of the rules associated with bidder EDDs 58 and/or bid taker EDDs 60 to obtain the exemplary unconstrained allocation 244 shown in FIG. 16. Relaxed allocation 242 and unconstrained allocation 244 illustrate other useful allocations that do not necessarily meet all of the constraints. For example, relaxed allocation 242 shows a total of five winning bids with an allocation value of $4,000 while unconstrained allocation 242 shows a total of six bids with an allocation value of $5,000. Unconstrained allocation 244 illustrates the effect of imposing no rules on the allocation of bids by the optimizing software.

With reference back to FIGS. 7a, 7b, 9a and 9b, relaxation importances 250, 252, 254 and 256 can be associated with rules 110, 130, 180 and 190, respectively. The use of these relaxation importances will now be described.

In FIG. 7a, cost constraint rule 110 has a value of ten included in relaxation importance 250. In FIG. 9a, counting constraint rule 180 includes a value of twenty in relaxation importance 254. Cost constraint rule 110 has a "soft" property 228 associated therewith and counting constraint rule 180 has a "soft" property 236 associated therewith. If the optimizing software determines that cost constraint rule 110 or counting constraint rule 180 can be relaxed to obtain a feasible allocation, but it is not necessary to relax both, then cost constraint rule 110 having a value of ten in its relaxation importance 250 would be relaxed instead of relaxing counting constraint rule 180 having a value of twenty in its relaxation importance 254.

In response to selecting relaxation solution 224 in FIG. 15, the optimizing software finds a feasible allocation while relaxing constraints according to the value included in the corresponding relaxation importance, if any. The greater the value included in the relaxation importance, the less likely the associated rule(s) will be relaxed. Relaxation solution 222 can also have an associated cost, e.g., 1000, which specifies the weight of the relaxation to be applied by the optimizing software. The relaxation cost is calculated by aggregating, over all relaxed rules, the amount by which the rule(s) are violated multiplied by the value included in the corresponding relaxation importance. The value associated with a relaxation importance causes the optimizing software to maximize or minimize one or more rules minus the relaxation cost associated with relaxation solution 224. For example, if relaxation solution 242 has a cost of 1000 associated therewith and another relaxation solution (not shown) has a cost of 2,000 associated therewith, and if both relaxation solutions are selected, the optimizing software will relax the rule(s) associated with the latter relaxation solution before relaxing the rules of the former relaxation solution. Thus, in this example, the optimizing software would determine an optimal allocation based on the relaxation solution having the greater cost.

Feasibility Obtainer Rule:

Bid taker EDD 60 can also or alternatively have associated therewith a feasibility obtainer rule (not shown) which causes the optimizing software to minimize the relaxation cost, instead of minimizing or maximizing objective rule(s), discussed above in connection with FIG. 14, minus a relaxation cost. More specifically, a feasibility obtainer rule causes the optimizing software to generate feasible allocations when a winning allocation with all of the rules active is unavailable. For example, suppose that constrained solution 222 of constraint relaxation rule 220 is selected. In response to this selection, the optimizing software will only attempt to generate a winning allocation. However, if bid taker EDD 60 includes a feasibility obtainer rule and the optimizing software determines that a feasible, constrained allocation cannot be found, it relaxes one or more rules in an attempt to find a feasible allocation.

As can be seen, bidder EDDs 58 and bid taker EDDs 60 enable bidders 22, bid takers 26 and/or exchange manager 24 to modify how the optimizing software determines an optimal allocation. This may be performed iteratively in order to see the effects of these modifications on the winning allocations.

The optimizing software can include suitable controls for terminating the determination of an allocation. One control is a maximum processing time whereupon, when the maximum processing time is reached, the optimizing software terminates processing of the bids and reports the best allocation found. Another control compares the best allocation found at any point in time with an optimal allocation, i.e., an allocation with all rules relaxed. If the difference between these two allocations reaches a predetermined value, the optimizing software terminates processing and reports the best allocation found. Another control is a manual abort that can be issued by, for example, the exchange manager. In response to receiving this manual abort, the optimizing software terminates processing and reports the best allocation found.

Live, Expressive Combinatorial Exchanges:

In a live, expressive combinatorial exchange, e.g., a pure exchange, a forward auction or a reverse auction, it is desirable to provide feedback regarding the exchange to bidders, especially each bidder having a bid not included in an allocation, and/or bid takers in order to enhance competition and, potentially, make subsequent bidding and/or bid taking easier. A method of conducting a live, expressive combinatorial exchange will now be described with reference to FIG. 17, and with reference back to FIG. 3.

The method commences at start step 300 with exchange manager 24 initiating the exchange event. The method then advances to step 302 where the exchange manager 24 receives from each of a plurality of bidders 22 at least one bid 50 comprised of at least one item 52, an initial quantity 54 of each item 52, and a price 56 for all of the item(s) and their quantities 54.

At a suitable time, the method advances to step 304 where the optimizing software determines from the received bids an allocation that is optimal for the type of exchange being conducted. In a live combinatorial exchange, each bid 50 that is part of the allocation will include all of the items 52 of the bid 50 and at least part of the initial quantity 54 of each item 52. For example, if an allocation includes a bid 50 that includes item I1 52-1 and item I2 52-2, all or part of the quantity Q1 54-1 of item I1 52-1 will be included in the allocation and all or part of the quantity Q2 54-2 of item I1 52-1 will be included in the allocation.

Once the allocation has been determined, the method advances to step 306 where at least a portion of each bid of the allocation is returned to each bidder of a first subset of the bidders 22 that has at least one bid that is not included in the allocation for display on the display 18 of the computer system 2 of said bidder.

The method then advances to step 308 where each bidder of a subset of the first subset of bidders submits to exchange manager 24 a new bid and/or an amendment to an existing bid for processing by the optimizing software.

The method then advances to step 310 where a determination is made whether a predetermined condition is satisfied. If so, the method advances to stop step 312 and the exchange event terminates. However, if the predetermined condition is not fulfilled, the method returns to step 304 where, at a suitable time, the optimizing software determines another allocation that is optimal for the type of exchange being conducted. The bids processed by the optimizing software in this latter iteration of step 304 include all the bids from the immediately preceding iteration of step 304, including any amendments thereto in the immediately preceding iteration of step 308, along with any new bids received in the prior iteration of step 308. Once the other allocation has been determined in step 304, steps 306-310 are repeated. Thereafter, providing the predetermined condition in step 310 is not satisfied, steps 304-308 are repeated at suitable times during the course of the exchange event, e.g., periodically, after a predetermined number of bid(s) have been received, after each new or amended bid is received, etc., until the predetermined condition is satisfied whereupon the method advances to stop step 312 and the exchange event terminates.

Figure 17:
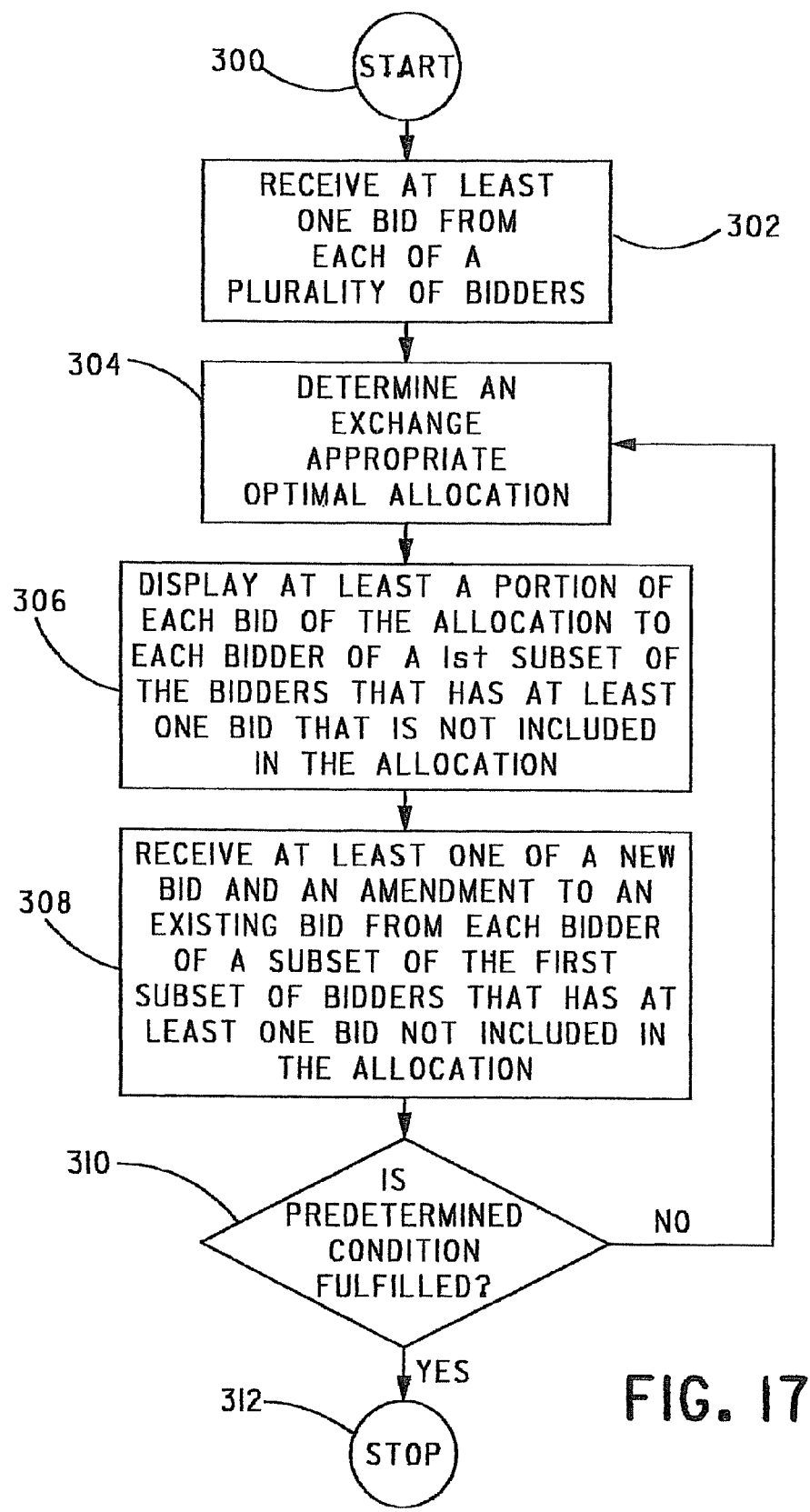
FIG. 17 is a flowchart of a method of conducting a live, expressive combinatorial exchange in accordance with the present invention.

As can be seen from the flowchart of FIG. 17, in step 306, each bidder not having a bid included in an allocation is provided with data regarding the bids that were included in the allocation. Based on this data, the bidder can do nothing, or, as shown in step 308, the bidder can amend an existing bid to make it more competitive whereupon it may be included in the allocation the next time step 304 is executed, or place a new bid that may be included in the next allocation the next time step 304 is executed. The process of determining an allocation based on received bids, providing feedback regarding the bids included in the allocation to bidders whose bids are not included in the allocation, receiving new or amended bids from at least some of the bidders provided with said feedback, and determining another allocation based on the new or amended bids and any other previously received bids continues until the predetermined condition is satisfied.

The predetermined condition can include, among other things, (i) a lapse of a predetermined time interval from commencement of the exchange, (ii) a manual abort, or (iii) a sum of prices of the bids of the allocation reaching a predetermined value.

The purpose of causing at least a portion of each bid included in the allocation to be displayed to each bidder that has at least one bid that is not included in the allocation is to enable the bidder to more effectively compete by facilitating the bidder's formulation of a new bid or an amendment to an existing bid that may result in the new bid or amended bid being included in the next allocation the next time step 304 is executed.

Supplying information regarding only one of the bids included in the allocation to bidders having at least one bid not included in the allocation is of little or no value in a combinatorial exchange since doing so does not provide sufficient information from which the bidders of bids not included in the allocation can formulate new bids or amendments to existing bids that will improve their chance of having a bid included in the next allocation.

Each bid of a subset of the bids can have bidder EDD 58 associated therewith. As discussed above, bidder EDD 58 comprises one or more rules for processing the associated bid, at least one item of the associated bid, and/or a subset of bids that includes all or less than all of the bids when determining the allocation.

When determining the allocation in step 304, the optimizing software desirably determines the allocation based on the bids received up to that time, i.e., new bids, amended bids and/or any other received bids, along with any bidder EDD associated with said bids. Thus, if each bid of a subset of the bids has bidder EDD associated therewith, the optimizing software determines the allocation based on all of the received bidder EDDs along with all of the received bids. The portion of each bid of the allocation that is displayed to each bidder of a first subset of bidders that has at least one bid that is not included in the allocation can include at least one item of the bid included in the allocation, the quantity of the at least one item of the bid, the price for all the item(s) and their quantities and/or at least a portion of the received bidder EDD 58 associated with the bid. The exchange manager 24 desirably sets the at least portion of each bid of the allocation that is displayed. However, this is not to be construed as limiting the invention.

Amending an existing bid in step 308 can include adding at least one new rule to bidder EDD 58 associated with the bid, deleting at least one rule from the bidder EDD 58 associated with the bid, amending a value associated with at least one rule of the bidder EDD 58 associated with the bid, amending a value of the quantity of at least one item of the bid, and/or amending the price for all of the items and their quantities.

Also or alternatively, the allocation can be determined in step 304 based on bid taker EDD 60. As discussed above, each bid taker EDD 60 comprises at least one rule (or constraint) for processing at least one of a bid, at least one item of a bid, and a subset of the plurality of the bids.

If desired, step 306 can include providing all or part of each bid taker EDD 60 to each bidder and/or bid taker participating in the exchange. Providing all or part of each bid taker EDD 60 to each bidder participating in the exchange facilitates the bidder's formulation of one or more new or amended bids of the bidder to improve the bidder's chance of having one or more bids included in the next allocation the next time step 304 is executed. Providing each bid taker participating in the exchange with all or a portion of each bid taker EDD 60 facilitates the bid taker's formulation of one or more new or amended bid taker EDDs 60 to maintain or improve the bid taker's competitiveness in subsequent iterations of step 304. Amendments to an existing bid taker EDD can include adding at least one new rule to the existing bid taker EDD, deleting at least one rule from the existing bid taker EDD, and/or amending a value associated with at least one rule of the existing bid taker EDD.

If desired, step 308 can include receiving from each bid taker of a subset of the bid takers at least one of a new bid taker EDD and an amendment to an existing bid taker EDD of the bid taker. The amendment to the existing bid taker EDD of the bid taker can include adding at least one new rule to the existing bid taker EDD, deleting at least one rule from the existing bid taker EDD, and amending a value associated with at least one value of the existing bid taker EDD.

Bidder EDDs 58 and bid taker EDDs 60 can be utilized by the optimizing software either alone or in combination to determine the allocation.

A portion of at least one bid included in the allocation can also be provided to each bidder of a second subset of bidders that has at least one bid that is part of the allocation, i.e., winning bidders, for display on the display 18 of the computer system 2 of said bidder. The purpose of displaying the at least portion of each bid included in the winning allocation to bidders having bids included in the winning allocation is to facilitate the formulation by each said bidder of a new bid or an amended bid that may result in said new bid or amendment bid being included in the allocation the next time step 304 is executed.

The portion of the at least one bid included in the allocation that is displayed on the display 18 of the computer system 2 of a winning bidder can include at least one item of the bid, the initial or allocated quantity of the at least one item of the bid, the price for all of the item(s) and/or quantities, and/or at least a portion of the bidder EDD associated with the bid.

In the foregoing description, each subset of bidders includes all or less than all of the plurality of bidders. Moreover, each subset of bids includes all or less than all of the received bids.

Rule Selection:

Each rule of each bidder EDD 58 established by a bidder 22 is desirably selected from a predetermined set of bidder rules established and maintained by the exchange manager 24 for the exchange event. Similarly, each rule of each bid taker EDD 60 established by a bid taker 26 is desirably selected from a predetermined set of bid taker rules established and maintained by the exchange manager 24 for the exchange event. Limiting the rules each bidder and bid taker can utilize in an exchange event enables the exchange manager 24 to better control the conduct of the exchange event.

Supervisory Constraint:

To further enable exchange manager 24 to control the conduct of the exchange event, each rule of a subset of the rules, i.e., all or less than all of rules, can also or alternatively have an exchange manager controllable supervisory constraint imposed thereon. Under the control of exchange manager 24, each supervisory constraint can impose one or more limits on at least one of (1) the addition of the corresponding rule to an EDD, (2) the deletion of the corresponding rule from an EDD, (3) the relaxation of the corresponding rule of an EDD, and/or (4) the tightening of the corresponding rule of an EDD.

Examples of the use of a supervisory constraint include: allowing or forbidding bidders and/or bid takers from adding or deleting the corresponding rule to or from an EDD; forcibly adding or deleting the corresponding rule to or from an EDD; allowing or forbidding bidders and/or bid takers to relax or tighten the corresponding rule, e.g., relaxing or tightening the maximum (or minimum) number of winners permitted in an allocation; and forcibly relaxing or tightening the corresponding rule. The listing of the foregoing examples is not be construed as limiting the invention since other uses of a supervisory constraint are envisioned.

Desirably, exchange manager 24 can selected when each supervisory constraint is active or inactive during an exchange event. If a supervisory constraint is inactive there are no limits on the use of the corresponding rule. However, if a supervisory constraint is active, the one or more limits associated with the supervisory constraint are imposed on the corresponding rule. For example, a supervisory constraint can be activated on or before an exchange event commences and can remain active throughout the exchange event whereupon the limit(s) associated with the supervisory constraint are imposed on the corresponding rule. In another example, a supervisory constraint can be inactive when the exchange event commences, but can be activated during the course of an exchange event and remain active throughout the remainder of the exchange whereupon the bidders and/or bid takers use of the rules and, hence, the conduct of the exchange event is altered. In yet another example, a supervisory constraint can be active when the exchange event commences, but can be inactivated during the course of an exchange event and remain inactive throughout the remainder of the exchange event to alter the conduct of the exchange event. The foregoing examples of when a supervisory constraint is or becomes active or inactive are not to be construed as limiting the invention.

Exchange Prolongation:

As discussed above, one predetermined condition for terminating a live, combinatorial exchange is the lapse of a predetermined time interval from commencement of the exchange event. Under certain conditions, however, it may be desirable to extend the predetermined time interval. One such condition includes the receipt of a bid within a predetermined duration of the end of the predetermined time interval that improves the allocation. For example, if a new or amended bid that improves the allocation is received within, for example, one minute of the end of the exchange, the predetermined time interval can be extended for a predetermined extension interval, e.g., five minutes. This process of extending the predetermined time interval can be repeated as desired.

In an exchange that includes plural bidders and plural bid takers, the allocation improves if (i) the number of items exchanged increases or (ii) if a difference between a sum of the prices of the buy bids and a sum of the prices of the sell bids of the allocation increases. In an exchange that includes plural buyers and a single seller (forward auction), the allocation improves if a sum of the prices of the bids of the allocation decreases. Lastly, in an exchange that includes a single buyer and plural sellers (reverse auction), the allocation improves if a sum of the prices of the bids of the allocation increases.

Logical Bid Combinations:

To facilitate processing of the bids by the optimizing software, all of the bids 50 received from bidders 22 can be logically OR'ed together and two or more bids 50 received from the same bidder that have at least one item in common can be logically XOR'ed together. This combination of logical operators enables each bidder to place two or more bids for the same item without, concern that the optimizing software will include said two or more of bids in the allocation whereupon the bidder is awarded more than a desired quantity of the item.

Bidder Identification:

In step 306 of the flowchart shown in FIG. 17, when at least a portion of each bid of the allocation is caused to be displayed to a first subset of bidders that has at least one bid that is not included in the allocation, an identification of the bidder of the bid can also be caused to be displayed. If desired, the displayed bidder identification can be obscured in the sense that the identity of the actual bidder is not clear from the displayed bidder identification.

Precondition and Decisional Construct:

At least one rule can be introduced into at least one bidder EDD in response to a bidder specifying (i) a precondition of said rule and (ii) an effect to apply if said precondition is satisfied. The precondition can include a scope, e.g., a specific geographical region, a specific group of items or item category, or a time window, such as second quarter, that the rule applies to, and a comparison for the scope, e.g., a total dollar volume greater than a predetermined dollar volume. Examples of effects that can be applied include giving a three percent discount on some subset of bids, determine the allocation to be infeasible, give a three percent handicap to the bids of a specific subset of bidders. For example, if the total dollar volume exceeds the predetermined dollar volume in a specific geographical region (the precondition), the rule is associated with the appropriate bidder EDD whereupon the effect of the rule is considered when determining the allocation. In contrast, if the total dollar volume does not exceed the predetermined dollar volume, the rule is not associated with the bidder EDD. Similarly, at least one rule associated with at least one bid taker EDD can be associated therewith in response to a bid taker specifying (i) a precondition of said rule and (ii) an effect to apply if said precondition is satisfied. The bidder and/or the bid taker desirably utilizes a graphical user interface on a display 18 of a computer 2 to specify the precondition and the effect.

The invention has been described with reference to the preferred embodiments. Obvious modifications and alterations will occur to others upon reading and understanding the preceding detailed description. For example, the foregoing examples are for the purpose of illustration and are not to be construed in any way as limiting the invention. It is intended that the invention be construed as including all such modifications and alterations insofar as they come within the scope of the appended claims or the equivalents thereof.

The invention claimed is:

1. A computer-implemented method of conducting a live combinatorial exchange comprising:
   (a) a processor receiving from each of a plurality of bidders at least one bid comprised of a plurality of items, an initial quantity of each item, and a price for all of the items and their quantities;
   (b) the processor determining an allocation for a type of exchange being conducted, wherein said allocation includes a plurality of bids with each bid of said allocation including all of the items of the bid and at least part of the initial quantity of each item;
   (c) based on the allocation determined in step (b), the processor causing at least a portion of two or more bids of said allocation to be displayed to each bidder of a first subset of the bidders that has at least one bid that is not included in said allocation;
   (d) the processor receiving from each bidder of a subset of the first subset of bidders at least one of the following: a new bid or an amendment to an existing bid of the bidder; and
   (e) the processor repeating steps (b)-(d) until a predetermined termination condition for the exchange is satisfied.

2. The method of claim 1, wherein each item includes one of a tangible good, a service and money.

3. The method of claim 1, wherein:
   each bid of a subset of the bids has associated therewith exchange description data (EDD) established by the bidder of said bid (bidder EDD);
   bidder EDD comprises at least one rule (or constraint) for processing at least one of the following: (i) a bid, (ii) at least one item of a bid, or (iii) a subset of bids that includes all or less than all of the bids when determining the allocation; and
   step (b) further includes determining the allocation as a function of bidder EDD.

4. The method of claim 3, wherein bidder EDD includes at least one rule related to at least one of the following: bid attribute(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request, or reserve price(s).

5. The method of claim 3, wherein the portion of each bid in step (c) includes at least one of the following: (i) the at least one item of the bid, (ii) the quantity of the at least one item of the bid, (iii) the price for all of item(s) and their quantities, or (iv) at least a portion of the bidder EDD.

6. The method of claim 3, wherein the amendment to the existing bid in step (d) includes at least one of the following:
   the addition of at least one new rule to bidder EDD associated with the existing bid;
   the deletion of at least one rule from bidder EDD associated with the existing bid;
   the amendment of a value associated with at least one rule of bidder EDD associated with the existing bid;

the amendment of a value of the quantity of at least one item of the existing bid; or the amendment of the price for all of item(s) and their quantities.

7. The method of claim 6, further including imposing at least one supervisory constraint that limits at least one of the following: (i) adding at least one rule to a bidder EDD, (ii) deleting at least one rule from a bidder EDD, (iii) relaxing at least one rule of a bidder EDD, or (iv) tightening of at least one said rule of a bidder EDD.

8. The method of claim 3, wherein:
step (b) further includes determining the allocation based on EDD established by a bid taker (bid taker EDD); and
step (d) further includes receiving from the bid taker at least one of the following: a new bid taker EDD or an amendment to an existing bid taker EDD of the bid taker, wherein the amendment to the existing bid taker EDD of the bid taker includes at least one of the following:
adding at least one new rule to the existing bid taker EDD;
deleting at least one rule from the existing bid taker EDD; or
amending a value associated with at least one rule of the existing bid taker EDD.

9. The method of claim 3, wherein at least one rule is introduced into at least one bidder EDD in response to a bidder specifying (i) a precondition of said rule and (ii) an effect to apply if said precondition is satisfied.

10. The method of claim 9, wherein the bidder specifies the precondition and the effect via a graphical user interface.

11. The method of claim 1, further including displaying a portion of at least one bid that was determined to be part of the allocation to each bidder of a second subset of bidders that has at least one bid that is part of the allocation.

12. The method of claim 11, wherein:
each subset of bidders includes (i) all or (ii) less than all of the plurality of bidders; and
each subset of bids includes (i) all or (ii) less than all of the bids.

13. The method of claim 11, wherein the portion of the at least one bid in step (c) includes at least one of the following: (i) at least one item of the bid, (ii) the initial or allocated quantity of at least one item of the bid, (iii) the price for all of item(s) and their quantities, or (iv) at least a portion of the bidder EDD.

14. The method of claim 1, wherein the exchange is either a forward auction or a reverse auction.

15. The method of claim 1, further including extending the predetermined time interval in response to receiving a bid that improves the allocation within a predetermined duration of the end of the predetermined time interval.

16. The method of claim 15, wherein:
in an exchange that includes plural bidders and plural bid takers, the allocation improves when (i) the number of items exchanged increases or (ii) a difference between a sum of the prices of the buy bids and a sum of the prices of the sell bids of the allocation increases;
in an exchange that includes a single buyer and plural sellers, the allocation improves if a sum of the prices of the bids of the allocation decreases; and
in an exchange that includes a single seller and plural buyers, the allocation improves if a sum of the prices of the bids of the allocation increases.

17. The method of claim 1, further including:
OR'ing all the received bids; and
XOR'ing bids received from one bidder that include at least one item in common.

18. The method of claim 1, wherein:
step (b) further includes determining the allocation as a function of exchange description data (EDD) established by a bid taker (bid taker EDD), wherein bid taker EDD comprises at least one rule (or constraint) for processing at least one of the following: (i) a bid, (ii) at least one item of a bid, or (iii) a subset of the plurality of the bids when determining the allocation; and
step (d) further includes receiving from the bid taker at least one of the following: a new bid taker EDD or an amendment to an existing bid taker EDD of the bid taker, wherein the amendment to the existing bid taker EDD of the bid taker includes at least one of the following:
adding at least one new rule to the existing bid taker EDD;
deleting at least one rule from the existing bid taker EDD; or
amending a value associated with at least one rule of the existing bid taker EDD.

19. The method of claim 18, further including imposing at least one supervisory constraint that limits at least one of the following: (i) adding at least one rule to a bid taker EDD, (ii) deleting at least one rule from a bid taker EDD, (iii) relaxing at least one rule of a bid taker EDD, or (iv) tightening of at least one said rule of a bid taker EDD.

20. The method of claim 18, wherein bid taker EDD includes at least one rule related to at least one of the following: objective(s), constraint relaxer(s), feasibility obtainer(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request and reserve price(s).

21. The method of claim 18, wherein at least one rule is introduced into at least one bid taker EDD in response to a bid taker specifying (i) a precondition of said rule and (ii) an effect to apply if said precondition is satisfied.

22. The method of claim 21, wherein the bid taker specifies the precondition and the effect via a graphical user interface.

23. The method of claim 1, wherein step (c) further includes causing an identification of the bidder of the bid to be displayed.

24. The method of claim 23, wherein the display of the bidder identification is obscured.

25. The method of claim 1, wherein the predetermined termination condition includes at least one of the following: (i) a lapse of a predetermined time interval from commencement of the exchange, (ii) a manual abort, or (iii) a sum of the prices of the bids of the allocation reaching a predetermined value.

26. A computer readable medium having stored thereon instructions which, when executed by a processor, cause the processor to perform the steps of:
(a) store in a memory of a computer at least one bid received from each of a plurality of bidders, wherein each bid is comprised of a plurality of items, an initial quantity of each item, and a price for all of the items and their quantities;
(b) determine an allocation for a type of exchange being conducted, wherein said allocation includes a plurality of the bids with each bid of said allocation including all of the items of the bid and at least part of the initial quantity of each item;
(c) based on the allocation determined in step (b), cause at least a portion of two or more bids of said allocation to be displayed to each bidder of a first subset of the bidders that has at least one bid that is not included in said allocation;

(d) store in a memory of a computer for each bidder of a subset of the first subset of bidders at least one of the following: a new bid or an amendment to an existing bid of the bidder; and (e) repeat steps (b)-(d) until a predetermined termination condition for the exchange is satisfied.

27. The computer readable medium of claim 26, wherein each item includes one of a tangible good, a service and money.

28. The computer readable medium of claim 26, wherein:
each bid of a subset of the bids has associated therewith an exchange description data (EDD) established by the bidder of said bid (bidder EDD);
bidder EDD comprises at least one rule (or constraint) for processing at least one of the following: (i) a bid, (ii) at least one item of a bid, or (iii) a subset of bids that includes all or less than all of the bids when determining the allocation; and
step (b) further includes determining the allocation as a function of bidder EDD.

29. The computer readable medium of claim 28, wherein bidder EDD includes at least one rule related to one of the following: bid attribute(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request or reserve price(s).

30. The computer readable medium of claim 28, wherein the portion of the at least one bid in step (c) includes at least one of the following: (i) the at least one item of the bid, (ii) the quantity of the at least one item of the bid, (iii) the price for all of item(s) and their quantities, or (iv) at least a portion of the bidder EDD.

31. The computer readable medium of claim 28, wherein the instructions further cause the processor to:
determine the allocation step (b) based on EDD established by a bid taker (bid taker EDD); and
receive from the bid taker step (d) at least one of the following a new bid taker EDD or an amendment to an existing bid taker EDD of the bid taker, wherein the amendment to the existing bid taker EDD of the bid taker includes at least one of the following:
the addition of at least one new rule to the existing bid taker EDD;
the deletion of at least one rule from the existing bid taker EDD; or
the amendment of a value associated with at least one rule of the existing bid taker EDD.

32. The computer readable medium of claim 28, wherein at least one rule is introduced into at least one bidder EDD in response to a bidder specifying (i) a precondition of said rule and (ii) an effect to apply if said precondition is satisfied.

33. The method of claim 32, wherein the bidder specifies the precondition and the effect via a graphical user interface.

34. The computer readable medium of claim 26, wherein the instructions further cause the processor to display a portion of at least one bid that was determined to be part of the allocation to each bidder of a second subset of bidders that has at least one bid that is part of the allocation.

35. The computer readable medium of claim 34, wherein:
each subset of bidders includes (i) all or (ii) less than all of the plurality of bidders; and
each subset of bids includes (i) all or (ii) less than all of the bids.

36. The computer readable medium of claim 34, wherein the portion of the at least one bid in step (c) includes at least one of the following: (i) at least one item of the bid, (ii) the initial or allocated quantity of at least one item of the bid, (iii) the price for all of item(s) and their quantities, or (iv) at least a portion of the bidder EDD.

37. The computer readable medium of claim 26, wherein the exchange is either a forward auction or a reverse auction.

38. The computer readable medium of claim 26, wherein the amendment to the existing bid in step (d) includes at least one of the following:
the addition of at least one new rule to bidder EDD associated with the existing bid;
the deletion of at least one rule from bidder EDD associated with the existing bid;
the amendment of a value associated with at least one rule of bidder EDD associated with the existing bid;
the amendment of a value of the quantity of at least one item of the existing bid; or
the amendment of the price for all of item(s) and their quantities.

39. The computer readable medium of claim 38, wherein the instructions further cause the processor to impose at least one supervisory constraint that limits at least one of the following: (i) adding at least one rule to a bidder EDD, (ii) deleting at least one rule from a bidder EDD, (iii) relaxing at least one rule of a bidder EDD, or (iv) tightening of at least one said rule of a bidder EDD.

40. The computer readable medium of claim 26, wherein the instructions further cause the processor to extend the predetermined time interval in response to receiving a bid that improves the allocation within a predetermined duration of the end of the predetermined time interval.

41. The computer readable medium of claim 40, wherein:
in an exchange that includes plural bidders and plural bid takers, the allocation improves if (i) the number of items exchanged increases or (ii) a difference between a sum of the prices of the buy bids and a sum of the prices of the sell bids of the allocation increases;
in an exchange that includes a single buyer and plural sellers, the allocation improves if a sum of the prices of the bids of the allocation decreases; and
in an exchange that includes plural buyers and a single seller, the allocation improves if a sum of the prices of the bids of the allocation increases.

42. The computer readable medium of claim 26, wherein the instructions further cause the processor to:
logically OR all the received bids; and
logically XOR all bids received from one bidder that include at least one item in common.

43. The computer readable medium of claim 26, wherein the instructions further cause the processor to:
determine the allocation in step (b) as a function of exchange description data (EDD) established by a bid taker (bid taker EDD), wherein bid taker EDD comprises at least one rule (or constraint) for processing at least one of the following: (i) a bid, (ii) at least one item of a bid, or (iii) a subset of the plurality of the bids when determining the allocation; and
receive from the bid taker in step (d) at least one of the following: a new EDD or an amendment to an existing EDD of the bid taker, wherein the amendment to the existing EDD of the bid taker includes at least one of the following:
adding at least one new rule to the existing bid taker EDD;
deleting at least one rule from the existing bid taker EDD; or
amending a value associated with at least one rule of the existing bid taker EDD.

44. The computer readable medium of claim 43, wherein the instructions further cause the processor to impose at least one supervisory constraint that limits at least one of the following: (i) adding at least one rule to a bid taker EDD, (ii) deleting at least one rule from a bid taker EDD, (iii) relaxing at least one rule of a bid taker EDD, or (iv) tightening of at least one said rule of a bid taker EDD.

45. The computer readable medium of claim 43, wherein bid taker EDD includes at least one rule related to at least one of the following: objective(s), constraint relaxer(s), feasibility obtainer(s), bid adjustment(s), item attribute(s), item adjustment(s), free disposal, action, cost constraint/requirement, unit constraint/requirement, counting constraint/requirement, homogeneity constraint, mixture constraint, cost/unit condition pricing, quote request, or reserve price(s).

46. The computer readable medium of claim 43, wherein at least one rule is introduced into at least one bid taker EDD in response to a bid taker specifying (i) a precondition of said rule and (ii) an effect to apply if said precondition is satisfied.

47. The method of claim 46, wherein the bid taker specifies the precondition and the effect via a graphical user interface.

48. The computer readable medium of claim 26, wherein the instructions further cause the processor to cause an identification of the bidder of said bid to be displayed in step (c).

49. The computer readable medium of claim 48, wherein the instructions further cause the processor to obscure the display of bidder identification.

50. The method of claim 26, wherein the predetermined termination condition includes at least one of the following: (i) a lapse of a predetermined time interval from commencement of the exchange, (ii) a manual abort, or (iii) a sum of the prices of the bids of the allocation reaching a predetermined value.

* * * * *